United States Patent
McGrath et al.

(10) Patent No.: US 8,028,842 B2
(45) Date of Patent: Oct. 4, 2011

(54) CHLORINE RESISTANT DESALINATION MEMBRANES BASED ON DIRECTLY SULFONATED POLY(ARYLENE ETHER SULFONE) COPOLYMERS

(75) Inventors: James E. McGrath, Blacksburg, VA (US); Ho Bum Park, Austin, TX (US); Benny D. Freeman, Austin, TX (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 1140 days.

(21) Appl. No.: 11/655,319

(22) Filed: Jan. 18, 2007

(65) Prior Publication Data
US 2007/0163951 A1    Jul. 19, 2007

Related U.S. Application Data

(60) Provisional application No. 60/759,550, filed on Jan. 18, 2006.

(51) Int. Cl.
  *B01D 39/14* (2006.01)
  *B01D 39/00* (2006.01)
  *B29C 65/00* (2006.01)

(52) U.S. Cl. .............. 210/500.41; 210/500.27; 210/490; 264/41; 429/209

(58) Field of Classification Search ............. 210/500.27, 210/500.41, 652, 490; 264/41; 528/373, 528/391; 429/209
See application file for complete search history.

(56) References Cited

U.S. PATENT DOCUMENTS

| | | | |
|---|---|---|---|
| 4,277,344 A | 7/1981 | Cadotte | |
| 4,419,486 A | 12/1983 | Rose | |
| 4,920,193 A * | 4/1990 | Hann et al. | 528/171 |
| 4,992,485 A | 2/1991 | Koo et al. | |
| 5,304,307 A * | 4/1994 | Linder et al. | 210/490 |
| 5,593,588 A | 1/1997 | Kim et al. | |
| 5,876,602 A | 3/1999 | Jons et al. | |
| 6,026,968 A * | 2/2000 | Hachisuka et al. | 210/490 |
| 6,451,921 B2 | 9/2002 | Weisse et al. | |
| 7,361,729 B2 * | 4/2008 | McGrath et al. | 528/391 |
| 7,441,666 B2 * | 10/2008 | Kim et al. | 210/490 |
| 2002/0091225 A1 * | 7/2002 | McGrath et al. | 528/170 |
| 2004/0054125 A1 * | 3/2004 | Schindler et al. | 528/391 |
| 2004/0242710 A1 * | 12/2004 | Chamock et al. | 521/27 |
| 2005/0173341 A1 * | 8/2005 | Salinaro | 210/636 |
| 2006/0258836 A1 * | 11/2006 | McGrath et al. | 528/373 |

(Continued)

FOREIGN PATENT DOCUMENTS
EP   0275027 A2   7/1988
(Continued)

OTHER PUBLICATIONS

International Search Report and Written Opinion for PCT/US2007/001641 dated Oct. 1, 2007.
(Continued)

*Primary Examiner* — Ana M Fortuna
(74) *Attorney, Agent, or Firm* — Blank Rome LLP

(57) ABSTRACT

The present invention provides a membrane, kit, and method of making a hydrophilic-hydrophobic random copolymer membrane. The hydrophilic-hydrophobic random copolymer membrane includes a hydrophilic-hydrophobic random copolymer. The hydrophilic-hydrophobic random copolymer includes one or more hydrophilic monomers having a sulfonated polyarylsulfone monomer and a second monomer and one or more hydrophobic monomers having a non-sulfonated third monomer and a fourth monomer. The sulfonated polyarylsulfone monomer introduces a sulfonate into the hydrophilic-hydrophobic random copolymer prior to polymerization.

24 Claims, 29 Drawing Sheets

U.S. PATENT DOCUMENTS

2006/0276602 A1* 12/2006 Schindler et al. ............. 525/535
2007/0163951 A1* 7/2007 McGrath et al. ......... 210/500.41

FOREIGN PATENT DOCUMENTS

EP 0787525 A1 8/1997
WO WO 01/83091 * 8/2001

OTHER PUBLICATIONS

Bodalo, A., et al., "Sulfonated polyethersulfone membranes in the desalination of aqueous solutions," Desalination (2004), 168:277-282.

Ghi, P. Y., et al., "PFG-NMR Measurements of the Self-Diffusion Coefficients of Water in Equilibrium Poly(HEMA-co-THFMA) Hydrogels," Biomacromolecules (2002), 3:554-559.

Hamza, A., et al., "Sulphonated poly(2,6-dimethyl-l,4-phenylene oxide)-polyethersulphone composite membranes Effects of composition of solvent system, used for preparing casting solution, on membrane-surface structure and reverse-osmosis performance," J Membr Sci (1997), 129:55-64.

Harrison, W. L., et al., "Influence of the Bisphenol Structure on the Direct Synthesis of Sulfonated Poly(arylene ether) Copolymers. I," J Polym Sci Part A (2003), 41:2264-2276.

Hickner, M. A., et al., "Alternative Polymer Systems for Proton Exchange Membranes (PEMs)," Chem Rev (2004), 104:4587-4612.

Kerres, J. A., "Development of ionomer membranes for fuel cells," J Membr Sci (2001), 185:3-27.

Kim, Y. S., et al., "Effect of Acidification Treatment and Morphological Stability of Sulfonated Poly(arylene ether sulfone) Copolymer Proton-Exchange Membranes for Fuel-Cell Use above 100° C," J Polym Sci Part B (2003), 41:2816-2828.

Kim, Y. S., et al., "State of Water in Disulfonated Poly(arylene ether sulfone) Copolymers and a Perfluorosulfonic Acid Copolymer (Nafion) and Its Effect on Physical and Electrochemical Properties," Macromolecules (2003), 36:6281-9285.

Kreuer, K. D., "On the complexity of proton conduction phenomena," Solid State Ionics (2000), 136-137:149-160.

Mauritz, K. A., et al., "State of Understanding of Nafion," Chem Rev (2004), 104:4535-4585.

Roy, A., et al., "Influence of Chemical Composition and Sequence Length on the Transport Properties of Proton Exchange Membranes," J Polym Sci Part B (2006), 44:2226-2239.

Sankir, M., et al., "Synthesis and Characterization of 3,3-Disulfonated-4,4'-dichlorodiphenyl Sulfone (SDCDPS) Monomer for Proton Exchange Membranes (PEM) in Fuel Cell Applications," J Appl Polym Sci (2006), 100:4595-4602.

Schauer, J., et al., "The Preparation of Microporous Membranes from Blends of Poly(2,6-dimethyl-1,4-phenylene oxide) and Sulfonated Poly(2,6-dimethyl-1,4-phenylene oxide)," J Appl Polym Sci (1999), 73:161-167.

Soice, N. P., et al., "Oxidative Degradation of Polyamide Reverse Osmosis Membranes: Studies of Molecular Model Compounds and Selected Membranes," J Appl Polym Sci (1997), 129:55-64.

Springer, T. E., et al., "Characterization of Polymer Electrolyte Fuel Cells Using AC Impedance Spectroscopy," J Electrochem Soc (1996), 143:587-599.

Tessaro, I. C., et al., "Investigation of some aspects related to the degradation of polyamide membranes: aqueous chlorine oxidation catalyzed by aluminum and sodium laurel sulfate oxidation during cleaning," Desalination (2005), 181:275-282.

Wang, F., et al., "Synthesis of Highly Sulfonated Poly(arlene ether sulfone) Random (Statistical) Copolymers Via Direct Polymerization," Macromol Symp (2001), 175:387-395.

Wang, F., et al., "Direct polymerization of sulfonated poly(arylene ether sulfone) random (statistical) copolymers: candidates for new proton exchange membranes," J Membr Sci (2002), 197:231-242.

Whittingham, M. S., et al., "Introduction: Batteries and Fuel Cells," Chem Rev (2004), 104:4243-4244.

Winter, M., et al., "What are Batteries, Fuel Cells, and Supercapacitors?" Chem Rev (2004), 104:4245-4269.

Yu, X., et al., "Synthesis and Characterization of Multiblock Copolymers for Proton Exchange Membranes," ACS Div Fuel Chem (2005), 50:577-578.

Yu, X., et al., "Perfluorinated-Sulfonated Hydrophobic-Hydrophilic Multiblock Copolymers for Proton Exchange Membranes (PEMs)," PMSE Preprints (2006), 95:141-142.

Zawodzinski, T. A., "Determination of Water Diffusion Coefficients in Perfluorosulfonate Ionomeric Membranes," J Phys Chem (1991), 95:6040-6044.

* cited by examiner

Chlorine as hypochlorite, pH > 8.5

Chlorine as hypochlorous acid, pH < 5.5

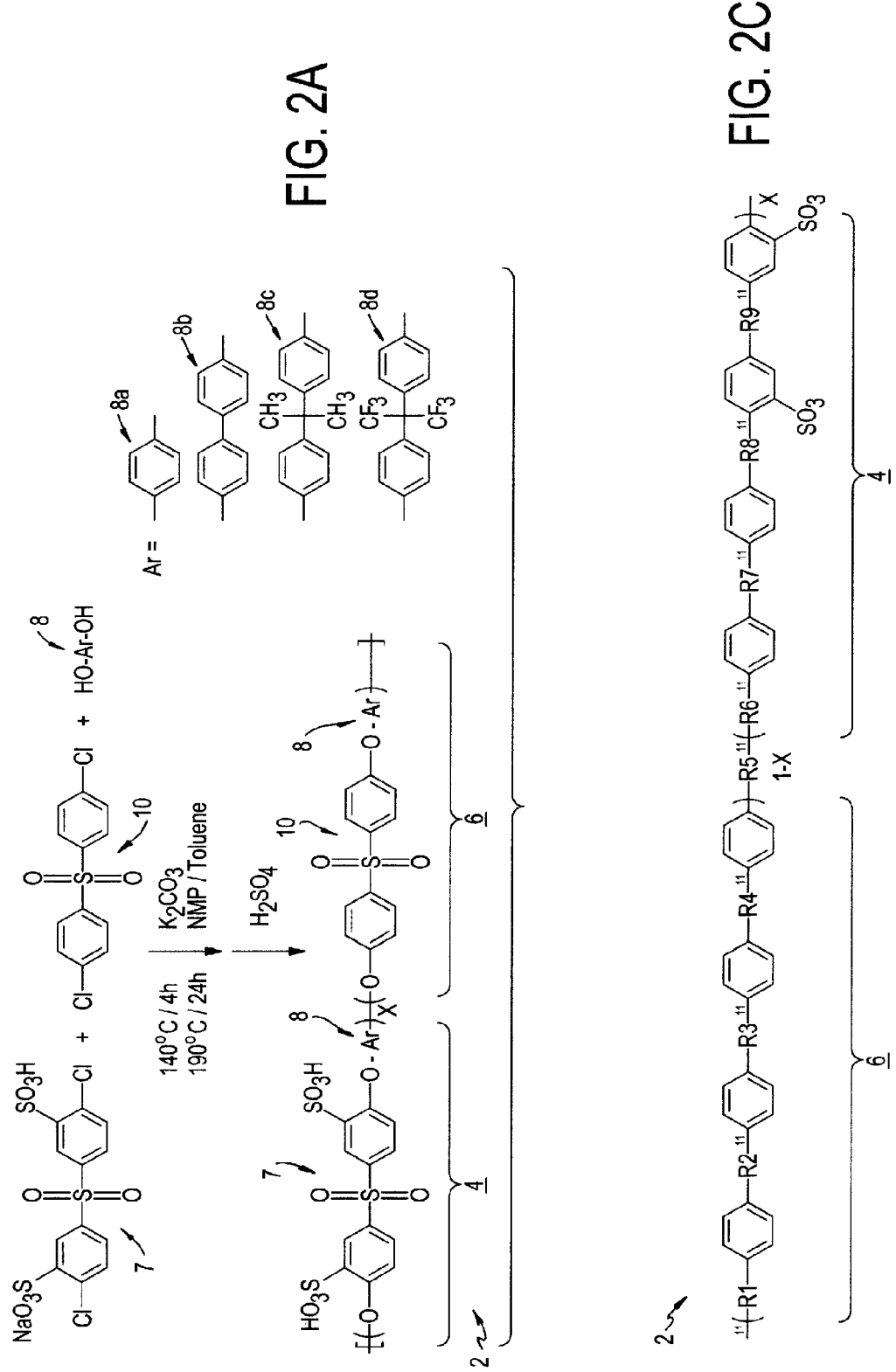

|  | Water permeability [L.μm/m2.h.bar] | NaCl rejection (%) | NaCl permeability (cm2/sec) |
|---|---|---|---|
| BPS 40H | 3.95 | 85.9 | $7.1 \times 10^{-8}$ |
| BPS 40N | 0.53 | 98.1 | NA |
| PA 40H | 0.76 | 95.3 | $1.1 \times 10^{-8}$ |
| PA 40N | 0.43 | 97.5 | NA | a)

b)

a)

b)

c)

FIGURE 23A
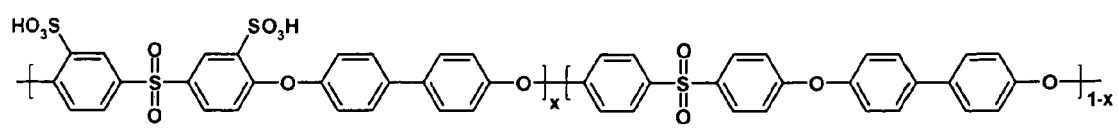
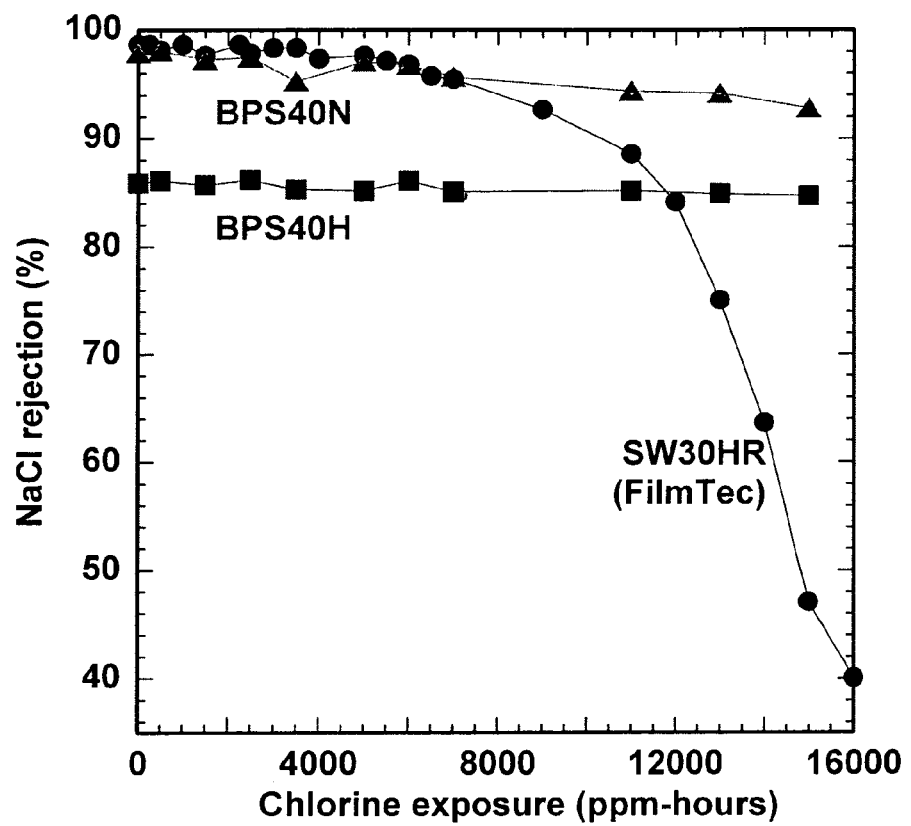
FIGURE 23B a)

Oily Water Fouling Behavior b)

CHLORINE RESISTANT DESALINATION MEMBRANES BASED ON DIRECTLY SULFONATED POLY(ARYLENE ETHER SULFONE) COPOLYMERS

BACKGROUND OF THE INVENTION

This application claims priority to U.S. Provisional Application No. 60/759,550, the entire contents of which are incorporated herein by reference. Without limiting the scope of the invention, its background is described in connection with poly (arylene ether) copolymers, oligomers, cross-linked copolymers, multi-block copolymers, polymers, and membranes having hydrophilic regions and hydrophobic regions.

STATEMENT OF FEDERALLY FUNDED RESEARCH

This invention was made with U.S. Government support under Contract No. DEFG 36-06G016038 awarded by the Department of Energy, Contract No. PO3561 awarded by the UTC Fuel Cell, and Contract No. N00014-05-1-0771 awarded by the Office of Naval Research. The government has certain rights in this invention.

TECHNICAL FIELD OF THE INVENTION

The present invention relates in general to the field of poly (arylene ether) polymers, and more particularly to sulfonated polyarylsulfone copolymers having hydrophilic regions and hydrophobic regions.

The number of people living without clean, piped water is about 1 billion. Approximately 41% of the Earth's population (about 2.3 billion people) lives in water-stressed areas, and that number is expected to grow to 3.5 billion by the year 2025. Water shortages not only threaten human life but also limit economic development. Furthermore, diseases associated with untreated water kill more than 25,000 people every day in developing countries. Chlorination is widely used to disinfect and treat water and can help control biofouling of membranes; however, reverse osmosis purification units are chlorine-sensitive. Generally, a cellulose reverse osmosis membrane can withstand a maximum of 1 ppm chlorine concentration for continuous use and 10 ppm for short periods. In addition, the cellulose reverse osmosis membrane has a narrow pH range. Commercial composite membranes may function at a broader pH but cannot tolerate any chlorine. For example, FIGS. 1A and 1B are graphs of the percent sodium chloride rejection for commercial polyamide membranes (membranes A-D) as a function of exposure to chlorine over time (see T. Knoell, Ultrapure Water, April 2006, pp. 24-31). The graphs show that commercially available polyamide membranes can withstand about 1,000 ppm-hours of free chlorine before exhibiting catastrophic loss of salt rejection. As a result of this sensitivity to chlorine, the chlorine is often removed in a step known as dechlorination before sending the water to reverse osmosis purification units.

There is a growing need for a water purification device that can tolerate chlorinated feedwater. Although polymer materials are used in variety of filtration application including purification of food and beverages, water treatment, pharmaceuticals preparations and in medical laboratories and diagnostics, commercially available membranes for water desalination by reverse osmosis are derived from two basic classes of polymers: cellulose acetates and polyamides. However, the cellulose acetate membranes are susceptible to microbiological attack, compaction at higher temperatures and pressures, and are limited to a relatively narrow pH range.

As a result of the limitations of cellulose acetate and polyamide materials, other polymer materials have been examined that exhibit biocompatibility, solvent compatibility, high temperature stability and reduced reactivity, e.g., polyetheretherketones polymers. These polymer materials led to the development of sulfonated polymer desalination membranes where the monomers are sulfonated after polymerization. Although these post-polymerization sulfonated polymers were chlorine tolerant, they suffered from undesirable side reactions and a lack of manufacturing reproducibility. The side reactions and reproducibility issues let to the withdrawal of post-polymerization sulfonated desalination membranes from the market.

For example, U.S. Pat. No. 4,992,485, entitled "Microporous PEEK Membranes And The Preparation Thereof," teaches a microporous polyetheretherketone membrane in the form of films and hollow fibers formed without sulfonating the polyetheretherketone polymer. The '485 patent also teaches a method of making membranes, fibers and articles from solutions of polyetheretherketone in non-sulfonating acid solvents. Solvents include methane sulfonic acid and trifluoromethane sulfonic acid. Sulfuric acid may be used as a diluent in non-sulfonating amounts. The polyetheretherketone membranes are used as supports for composite ultra filtration and reverse osmosis membranes.

Similarly, U.S. Pat. No. 4,419,486 entitled "Sulfonated Polyaryletherketones," teaches a polyaryletherketone polymer which is a hydrophilic sulfonated polymer derived by sulfonating a copolymer having the repeat unit where one is sulfonated after sulfonation and substantially all the units B remain non-sulfonated after sulfonation, e.g., sulfonation uses a 98% w/w concentrated sulfuric acid solution.

However, the methods currently used in the art, i.e., post-polymerization sulfonation, are plagued by side reactions and degradation reactions that cause a lack of reproducibility. These manufacturing reproducibility issues and inability to prepare a product with flux/rejection capabilities equivalent to aromatic polyamides led to withdrawal of sulfonated polymer-based desalination membranes from the market.

SUMMARY OF THE INVENTION

The present inventors recognized a need for a chlorine-tolerant reverse osmosis membrane that would control membrane biofouling and eliminate the dechlorination steps. The present inventors recognized that a chlorine-tolerant reverse osmosis membrane would allow higher feed pressure (i.e., higher flux) without biofouling, as the flux would no longer have to be restricted to low feed pressure to prevent flux from being greater than a critical value beyond which biofouling occurs.

The present inventors recognized that although commercial thin-film composite membranes have high water flux and salt rejection, they lack chemical stability to oxidants (e.g., chlorine), have a high fouling rate due to surface roughness and undergo biofouling due to a strong bacteria affinity. The present inventors recognized a need for a membrane that could resist different concentrations of chlorine and reduce fouling, i.e., a chlorine-tolerant desalination (i.e., reverse osmosis or nanofiltration) membrane.

Polyamide desalination membranes in general show improved transport properties at given applied pressure and stability over a wider range of pH compared to the cellulose acetate membranes; however, these polyamide membranes suffer from poor resistance to continual exposure to oxidizing agents such as chlorine in desalination applications. The present inventors recognized that sulfonated polymer membranes may be used to improve chlorine tolerance.

The present inventors recognized that what was needed was a new generation of desalination membranes for water purification, e.g., sulfonated polymer membranes that have high tolerance to the presence of chlorine in water and good reproducibility in fabrication, e.g., lacking the synthesis problems like chain scission and cross-linking that hampered previous desalination membranes prepared by post-polymerization sulfonation. The present inventors recognized the need for a polymeric desalination membrane having sulfonated monomers that are directly polymerized into the copolymer as opposed to the current methods of post polymerization sulfonation.

The present invention provides a polymeric membrane that can withstand the addition of chlorine into water purification systems such as reverse osmosis and nanofiltration. The present invention provides a membrane that can accommodate chlorine and has a minimal effect on the membrane flux and salt rejection rates. The present invention is effective in filtering oily waters and water containing components such as algae, organic contaminants and harmful trace metals like arsenic.

The present invention provides a method of making a hydrophilic-hydrophobic random copolymer by polymerizing one or more hydrophilic monomers and one or more hydrophobic monomers. The present invention also provides a method of making hydrophilic-hydrophobic random multi-block copolymer by polymerizing two or more hydrophilic monomers into a hydrophilic random oligomer and two or more hydrophobic monomers into a hydrophobic random oligomer. The hydrophilic random oligomer and the hydrophobic random oligomer are then combined to form a hydrophilic-hydrophobic random multi-block copolymer.

The present invention provides a method of making a hydrophilic-hydrophobic random copolymer membrane by forming a hydrophilic-hydrophobic random copolymer. The hydrophilic-hydrophobic random copolymer includes one or more hydrophilic monomers having a sulfonated polyarylsulfone monomer and a second monomer and one or more hydrophobic monomers having a non-sulfonated third monomer and a fourth monomer. The sulfonated polyarylsulfone monomer introduces a sulfonate into the hydrophilic-hydrophobic random copolymer.

The present invention also provides a hydrophilic-hydrophobic random copolymer membrane having one or more hydrophilic regions and one or more hydrophobic regions. The hydrophilic regions include a sulfonated polyarylsulfone monomer and a second monomer, while the hydrophobic regions include a non-sulfonated third monomer and a fourth monomer. The sulfonated polyarylsulfone monomer introduces a sulfonate into the hydrophilic-hydrophobic random copolymer prior to polymerization.

The present invention also provides a method of making a chlorine tolerant hydrophilic-hydrophobic copolymer desalination membrane. The membrane is made by forming a hydrophilic-hydrophobic random copolymer having one or more hydrophilic monomers and one or more hydrophobic monomers and forming the hydrophilic-hydrophobic random copolymer into a hydrophilic-hydrophobic copolymer desalination membrane. The hydrophilic monomers include a sulfonated polyarylsulfone monomer and a second monomer, while the hydrophobic monomers include a non-sulfonated third monomer and a fourth monomer. The sulfonated polyarylsulfone monomer introduces the sulfonate into the hydrophilic-hydrophobic random copolymer and provides a chlorine tolerant hydrophilic-hydrophobic copolymer desalination membrane.

A water purification kit having a chlorine tolerant hydrophilic-hydrophobic copolymer desalination membrane and a set of instructions is also provided by the present invention. The chlorine tolerant hydrophilic-hydrophobic copolymer desalination membrane includes one or more hydrophilic regions and one or more hydrophobic regions. The one or more hydrophilic regions include a sulfonated polyarylsulfone monomer and a second monomer. The one or more hydrophobic regions include a non-sulfonated third monomer and a fourth monomer. The sulfonated polyarylsulfone monomer introduces a sulfonate into the hydrophilic-hydrophobic random copolymer before polymerization.

A chlorine tolerant hydrophilic-hydrophobic multi-block copolymer desalination membrane is provided by the present invention. The chlorine tolerant hydrophilic-hydrophobic multi-block copolymer desalination membrane includes a hydrophilic random copolymer oligomer and a hydrophobic random copolymer oligomer. The hydrophilic random copolymer oligomer includes a sulfonated polyarylsulfone monomer and a second monomer, while the hydrophobic random copolymer oligomer includes a non-sulfonated third monomer and a monomer. The hydrophilic-hydrophobic multi-block copolymer desalination membrane is chlorine tolerant and includes one or more blocks of the hydrophilic random copolymer oligomer and one or more blocks of the hydrophobic random copolymer oligomer.

The present invention provides a hydrophilic-hydrophobic random copolymer desalination membrane having one or more units having the structure:

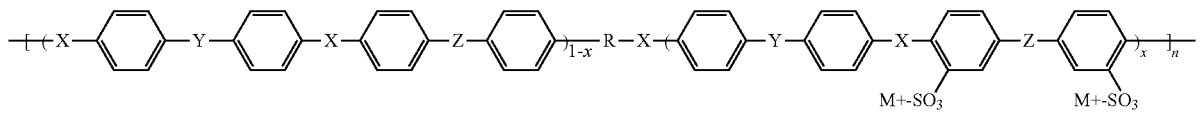

wherein X, Y, Z and R independently comprise an O, a S, a C, a F, C(CH$_3$)$_2$ group, a CF$_3$ group, a C(CF$_3$) group, a C(CF$_3$)$_2$ group, a C(CF$_3$)(C$_6$H$_5$) group, a C(O) group, a COO group, a S(O)$_2$ group, or a P(O)(C$_6$H$_5$) group, or a carbon-carbon single bond.

A chlorine tolerant hydrophilic-hydrophobic copolymer desalination membrane containing units of the following formula:

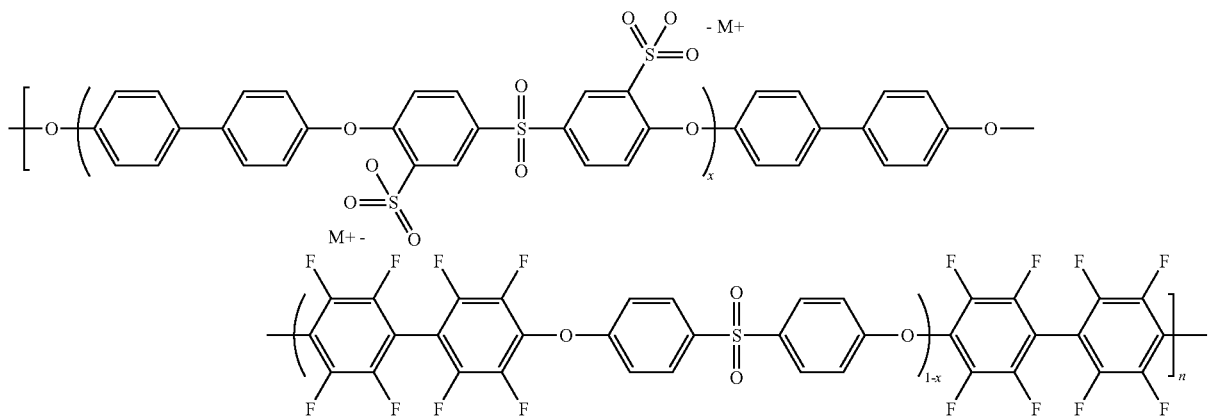

is also provided.

The present invention also provides a hydrophilic-hydrophobic random copolymer membrane for removing trace metals (e.g., arsenic) having one or more hydrophilic regions and one or more hydrophobic regions. The hydrophilic regions include a sulfonated polyarylsulfone monomer and a second monomer, while the hydrophobic regions include a non-sulfonated third monomer and a fourth monomer. The sulfonated polyarylsulfone monomer introduces a sulfonate into the hydrophilic-hydrophobic random copolymer prior to polymerization.

BRIEF DESCRIPTION OF THE DRAWINGS

For a more complete understanding of the features and advantages of the present invention, reference is now made to the detailed description of the invention along with the accompanying figures and in which:

FIG. 2A is a synthesis schematic for hydrophilic-hydrophobic random copolymers, while FIGS. 2B-2F are examples of sulfonated hydrophilic-hydrophobic random copolymers;

FIG. 14A is a table comparing the properties of sulfonated hydrophilic-hydrophobic random copolymers, FIGS. 14B and 14C are structures of sulfonated hydrophilic-hydrophobic random copolymer and FIG. 14D is a table comparing the properties of various copolymers;

FIG. 23 is a plot of the membrane performance under continuous exposure to free chlorine for sulfonated hydrophilic-hydrophobic random copolymer;

DETAILED DESCRIPTION OF THE INVENTION

Figure 1A:
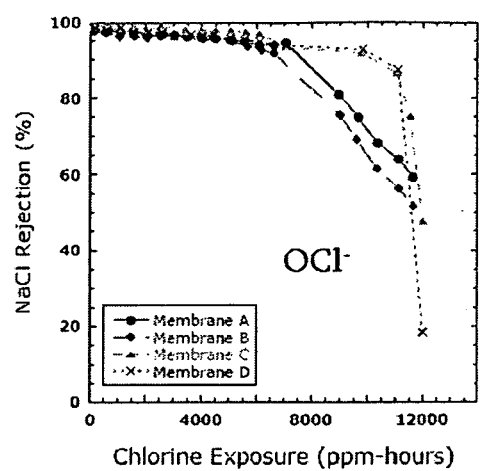
FIGS. 1A and 1B are graphs of the percent sodium chloride rejection for commercial polyamide membranes as a function of exposure to chlorine over time.
Figure 1B:
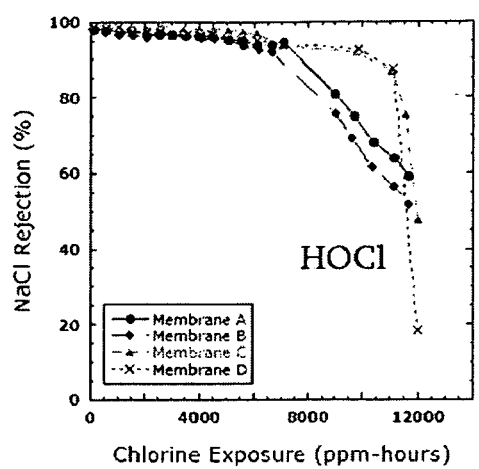

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

As used herein the term "molecule" is used to refer to a combination of two or more atoms in a definite arrangement held together by chemical bonds and is generally considered the smallest particle of a pure substance that still retains its composition and chemical properties.

In addition, the individual copolymers, subunits or polymers may be substituted with one or more molecules, groups or atoms. The number, position, location and type of modification may be varied by the skilled artisan. The modifications may include the addition of one or more of the following groups: lower alkyl, alkenyl, amino, aryl, alkylaryl, halogen, halo, haloalkyl, phosphoryl or combination thereof.

As used herein the term copolymer is defined as a polymer that is derived from more than one species of monomer. As used herein the term random copolymer is defined as a polymer structure with the probability of finding a given monomeric unit at any given site in the polymer independent of the nature of the neighboring units at that position. The term random copolymer also encompassed the term random block copolymers, which is defined as two discrete blocks of copolymers where one or more of these blocks are composed of a random copolymer segment. As used herein the term block copolymers is defined as a polymer having a portion in which the monomeric units have at least one constitutional or configurational feature absent from the adjacent portions.

As used herein the term BPS-XX is used to denote the general sulfonated copolymer structure having a sulfonated poly(arylene ether sulfone), where XX indicates the mole percentage or mole percent, e.g., 10, 20, 30, 35, 40, 45, 50, 60 and 70 mol %. As used herein the term mole percent (% X) or (XX) is defined as the concentration of a substance in a mixture measured as moles of the substance per mole of mixture.

In addition, the terms BPSH and/or BPSH-XX are used interchangeably to denote the acidic form or H form of the sulfonated random copolymer structure, where the sulfonate group is associated with an $H^+$. Alternatively, the terms BPSNa, BPSN, BPSNa-XX and/or BPSN-XX are used interchangeably to denote the salt form or sodium form of the sulfonated multi-block copolymer structure where the sulfonate group is associated with a $Na^+$. For example, BPSH-50 is a sulfonated poly(arylene ether sulfone) copolymer (BPS) in the H+ form (H) and indicates 50 mole percentage (50).

Current sulfonated polymer membrane for reverse osmosis applications display stability over a pH range of about 4 to about 11, with a high water flux and high chlorine tolerance. However, the sulfonated polymer membranes suffer from insufficient stability and performance characteristics mainly due to the conventional post-sulfonation techniques. In addition, sulfonated polymer membranes are difficult to prepare and lack structural reproducibility (e.g., excessive IEC can lead to water solubility issues and/or high water flux but poor salt rejection, while low IEC results in high rejection, but low water flux). In addition, the heterogeneous sulfonation makes it is difficult to predict water transport through the membrane and control the membrane morphology.

The present invention provides a sulfonated copolymer membrane, based on chemistry that is entirely different from the conventional technology. The present invention uses direct copolymerization of sulfonated monomer and other monomers to produce a reproducible sulfonated copolymer membrane that can be tailored for a specific purpose, e.g., reverse osmosis and nanofiltration. The present invention overcomes the problems of conventional technology such as molecular weight reduction during post-polymerization sulfonation. In addition, the resulting sulfonated polymer membranes exhibit extraordinary high tolerance to chlorine attack, which is in contrast to conventional commercial desalination membranes such as polyamide and cellulose acetate membranes.

Conventional desalination membranes (e.g., thin-film polyamide and cellulose acetate) have poor tolerance to chlorine, so water purification processes often include chlorination of feed water (to control biological components that would biofoul the membranes) followed by dechlorination (to protect the membranes) before feeding water to be purified to desalination membranes. Chlorine is by far the most common and least expensive disinfectant in the water purification industry because it is fairly persistent and relatively inexpensive. Disinfection of water fed to desalination membranes is required to inhibit membrane biofouling. The present invention provides a chlorine-resistant desalination membrane. Therefore, the present invention provides desalinating and purifying of chlorinated feed water without any steps to dechlorinate the water prior to being fed to the membrane units.

The present invention provides a method of producing membranes that is highly reproducible, e.g., current polymers can be readily prepared using a direct copolymerization of sulfonated monomers, yielding very reproducible materials. The present invention also provides increased efficiency and is cost-effective. The highly chlorine tolerant membranes of the present invention allow the chlorination and rechlorination steps to be eliminated to significantly reduce the complexities of these processes and improve the longevity of the membranes. The resulting process reduces the cost of producing pure water for commercial, agricultural, livestock and human consumption applications.

The present invention allows tailoring of the transport properties of these polymers by controlling the chemical structure of the hydrophobic segments, resulting in versatile membranes for applications such as nanofiltration and reverse osmosis. In addition, the present invention provides membranes exhibiting high flux, high salt rejection, high chlorine tolerance and excellent anti-fouling properties. The present invention provides desalination membranes in the form of thin-film composite membranes and asymmetric membranes that can produce high flux water with excellent purity. In addition, the membranes may be scaled to quantities and effective thicknesses relevant to industrial applications.

The present invention also provides a membrane for dehydration applications. The polymer membranes of the present invention are hydrophilic and allow water molecules to permeate more selectively in water-organic mixtures (e.g., removal of water from organic solvents (e.g., alcohols and chlorinated hydrocarbons) using pervaporation).

The copolymers of the present invention provide random copolymers that have a random copolymer structure with monomers that are hydrophilic and hydrophobic. The hydrophilic regions include sulfonated molecules (e.g., 3,3'-disulfonated-4,4'-dichlorodiphenylsulfone) that sulfonate prior to polymerization and can exist in the H+ state or the Na+ state. The hydrophobic regions include a non-sulfonated molecule (e.g., 4,4'-dichlorodiphenylsulfone). As a random copolymer the probability of finding a given monomer at any given site in the polymer is independent of the nature of the neighboring units at that position.

In addition, the random copolymer structure with monomers that are hydrophilic and hydrophobic may be cross-linked to form polymer films and/or membranes. In addition, the random copolymer structure with monomers that are hydrophilic and hydrophobic of the present invention may be cross-linked to control the ionic group concentration. The skilled artisan will recognize that by varying the degree of cross-linking of the random copolymers, the polymers can have very high concentrations of ionic groups (i.e., sulfonic acid) without a high water uptake. The cross-linking of the random copolymer structure with monomers that are hydrophilic and hydrophobic of the present invention provides for the manipulation of the water content and IEC independently. For example, a copolymer membrane may be made cross-linking random copolymer structure with monomers that are hydrophilic and hydrophobic to form a high ionic group (i.e., sulfonic acid) concentration and moderate water uptake and a relatively high permeability to produce high rejection via the Donnan Exclusion effect.

Figure 2B:
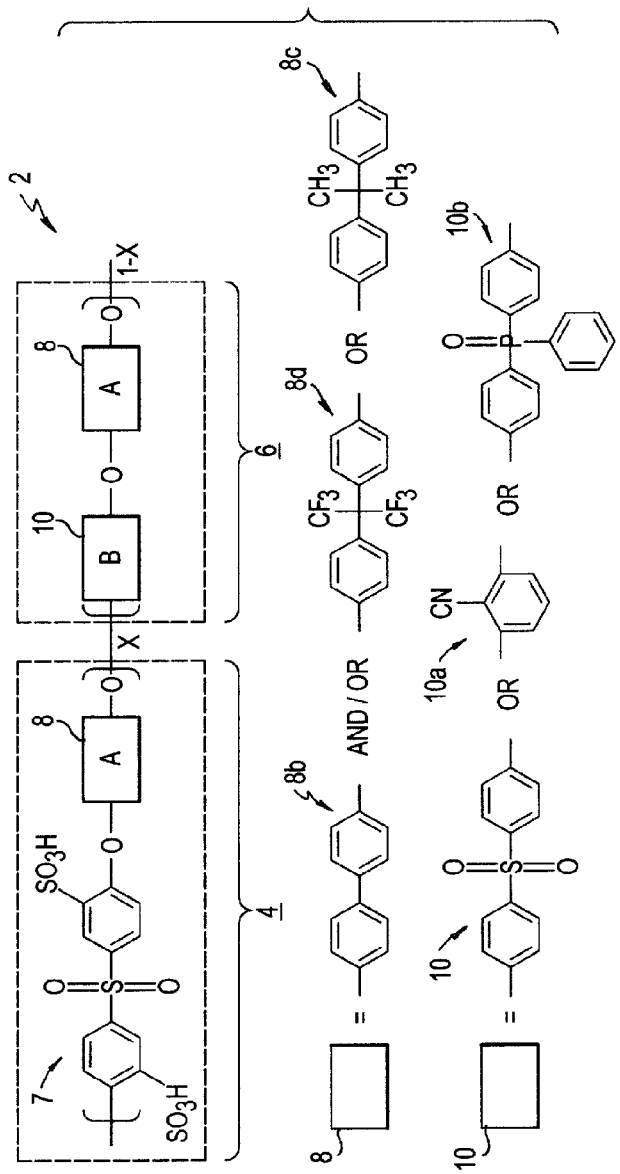

FIGS. 2A, 2B 2C, 2D, 2E and 2F are images that illustrates the structure of a hydrophilic-hydrophobic random copolymer. FIG. 2A is a synthesis schematic of the synthesis of hydrophilic-hydrophobic random copolymer. The hydrophilic-hydrophobic random copolymer 2 has a hydrophilic region 4 and a hydrophobic region 6. The hydrophilic region 4 includes the 3,3'-disulfonated-4,4'-dichlorodiphenylsulfone monomer 7 and a second monomer 8. Similarly, the hydrophobic region 6 includes a third monomer 10 (in this case a 4,4'-dichlorodiphenylsulfone) connected to a second monomer 8. The hydrophilic region 34 includes X number of repeats, while the hydrophobic region 6 includes 1-X number of repeats. The hydrophilic-hydrophobic random copolymer 2 has a random structure with the probability of finding a given monomeric unit at any given site in the polymer independent of the nature of the neighboring units at that position.

The hydrophilic-hydrophobic random copolymer 2 is made through a nucleophilic aromatic substitution reaction between precursors of the 3,3'-disulfonated-4,4'-dichlorodiphenylsulfone monomer 7 and the second monomer 8 and the second monomer 8 and the third subunit 10. The second monomer 8 may be a phenyl, a biphenyl, a bisphenyl, a biphenyl connected through an intermediate atom or molecule, a substituted phenyl, biphenyl, 2-2-bis-phenylpropane or a 1,1-di(trifluoromethane)(diphenylmethane) (8a-d respectively).

FIG. 2B represents a general sulfonated random copolymer structure 2 containing a hydrophilic region 4 and a hydrophobic region 6. The hydrophilic region 4 contains a 3,3'-disulfonated-4,4'-dichlorodiphenylsulfone monomer 7 and a second monomer 8, while the hydrophobic region 6 contains a second monomer 8 and a third monomer 10. For example, the second monomer 8 may be a biphenyl 8b, a 1,1-di(trifluoromethane)(diphenylmethane) 8d or 2-2-bis-phenylpropane 8c, while the third monomer 10 may be a 4,4'-dichlorodiphenylsulfone 10, a 2,6-dichloro-benzonitrile 10a or a 4,4'-difluoro-triphenyl phosphine oxide 10b. It should be noted that these structures and groups are illustrative and in no way limit the actual structures that may be used as monomers.

FIG. 2C illustrates a general formula for the sulfonated random polymer of the present invention. The sulfonated random copolymer structure 2 containing a hydrophilic region 4 and a hydrophobic region 6. The hydrophilic region 4 is contains "X" repeats, while the hydrophobic region 6 contains "1-X" repeats. The entire sulfonated random copolymer structure 2 is repeated. "n" times. The sulfonated random copolymer structure 2 contains modification sites R1 to R9, which may individually be atoms, molecules, compounds, or bonds as desired by the skilled artisan.

For example, FIG. 2D illustrates a more specific example of the sulfonated random copolymer structure 2. The sulfonated random copolymer structure 2 includes individual molecules X, Y and Z, which may be independently a O, a S, a C, a F, a CO group, a $SO_2$ group, a $CF_2$ group, a $C(CF_3)_2$ group, a $C(CH_3)_2$ group, a COO group, a phenylphosphonyl group, a 2,6-dichloro-benzonitrile group, a single bond or other atom or group known to the skilled artisan. For example, the sulfonated random copolymer structure 2 may include a O or S at the X position; a single bond, a $C(CF_3)_2$ group, a $C(CH_3)_2$ group, a SOO group or a phenylphosphonyl group at the Y position; and a CO group, a $SO_2$ group or a phenylphosphonyl group at the Z position. See specifically, FIG. 2E where Y is a bond; X is an O and Z is a $SO_2$.

One specific example is shown in FIG. 2E, where given the sulfonated random copolymer structure 2 containing a hydrophilic region 4 and a hydrophobic region 6, X is an O, Y is a single bond and Z is a $SO_2$ group. The hydrophilic region 4 is contains "X" repeats, while the hydrophobic region 6 contains "1-X" repeats. The entire sulfonated random copolymer structure 2 is repeated "n" times. FIG. 2F is a general sulfonated-fluorinated random copolymer structure 2 that is modified at the X position 12 by the addition of an isopropylidene unit 14; a hexafluoroisopropylidene unit 16; or a sulfone group 18. The corresponding copolymers are termed BisAF-BPSH, 6FBisAF-BPSH, and BisSF-BPSH, respectively. The hydrophilic region 4 is contains "X" repeats, while the hydrophobic region 6 contains "1-X" repeats. The entire sulfonated random copolymer structure 2 is repeated "n" times.

In addition, the random copolymer structures may be modified by the addition or substitution of one or more of the following groups: lower alkyl, alkenyl, amino, aryl, alkylaryl, halogen, halo, haloalkyl, phosphoryl or combination thereof. In addition, the modification may be similarly modified with one or more lower alkyl, alkenyl, amino, aryl, alkylaryl, halogen, halo, haloalkyl, phosphoryl or combination thereof.

4,4'-Dihydroxydiphenyl sulfone (bisphenol-S) and decafluorobiphenyl were obtained from Aldrich and dried under vacuum before use. 4,4'-Dichlorodiphenylsulfone (DCDPS) was obtained from Solvay Advanced Polymers and used as received. 3,3'-Disulfonated-4,4'-dichlorodiphenylsulfone (SDCDPS) was synthesized from DCDPS according to a process reported elsewhere.[12] 4,4'-Biphenol was obtained from Eastman Chemical and used as received. N-methyl-2-pyrrolidone (NMP), purchased from Aldrich, was vacuum-distilled from calcium hydride and stored under nitrogen.

Synthesis of the fluorinated hydrophobic BisSF oligomers. Bisphenol-S (1.287 g, 5.142 mmol) was added to a three neck round bottom flask equipped with a mechanical stirrer, a condenser, a nitrogen inlet and a Dean-Stark trap. NMP (10 mL) was added to the flask and the mixture was dissolved. Then $K_2CO_3$ (1.183 g, 7.20 mmol) was added, followed by 5 mL of cyclohexane. The reaction bath was heated to 150° C. and kept at this temperature for 2 hours to dehydrate the system. The reaction was cooled to 50° C. and decafluorobiphenyl (2.046 g, 6.124 mmol) was added. The bath temperature was raised to 110° C. and the reaction was allowed to proceed at this temperature for 5 hours. The mixture was precipitated into 200 mL of water/methanol (50/50 v/v) and rinsed with water and methanol. The precipitated polymer was dried under vacuum at 100° C.

Synthesis of the diphenoxide functional BPS100 oligomers. A three neck round bottom flask, equipped with a mechanical stirrer, a condenser, a nitrogen inlet and a Dean-Stark trap, was charged with biphenol (0.412 g, 2.213 mmol), SDCDPS (0.912 g, 1.856 mmol), and 10 mL of NMP. The mixture was dissolved, then $K_2CO_3$ (0.430 g, 3.12 mmol) and 5 mL of toluene was added. The reaction bath was heated to 150° C. to dehydrate the system. Then the bath temperature was then slowly raised to 190° C. by the controlled removal of toluene. The polymerization was allowed to proceed at this temperature for 30 hours, and the resulting oligomer was used in the block copolymer synthesis without isolation.

Synthesis of the BisSF-BPSH block copolymer. The reaction bath for the hydrophilic oligomer synthesis was cooled to 80° C., and the perfluoro hydrophobic oligomer (1.050 g, 0.350 mmol) was dissolved in 10 mL of NMP and added to the same reaction flask. The bath temperature was raised to 110° C. and kept at this temperature for 4 days. The reaction mixture was precipitated into 300 mL of isopropanol to obtain a fibrous polymer. The product was stirred in deionized water at 60° C. for 12 hours and in acetone for 12 hours, and dried under vacuum at 120° C. for 24 hours.

The random copolymerization procedures for the well dried monomers were similar for all the bisphenols, even though the reactivities were different. A typical copolymerization for all the sulfonated copolymers is described with the BPA-40 system as an example. First, 1.2624 g (5.5 mmol) of BPA, 0.9621 g (3.3 mmol) of DCDPS, and 1.0806 g (2.2 mmol) of SDCDPS (rapidly weighed) were added to a three necked flask equipped with an overhead mechanical stirrer, a nitrogen inlet, and a Dean-Stark trap. Potassium carbonate (6.3 mmol, 0.88), and sufficient NMP (18 mL) were introduced to afford a 20% (w/v) solid concentration. Toluene 9 mL; usually, NMP/toluene 2/1 v/v) was used as an azeotroping agent. The reaction mixture as refluxed at 150° C. for 4 hours to dehydrate the system. The temperature was raised slowly to 190° C. by the controlled removal of the toluene. The reaction was allowed to proceed for 16-35 hours, during which time the solution became very viscous. The solution was cooled to room temperature and diluted with enough DMAc to allow easier filtering. After filtration with a filter paper removed most of the salts, the copolymer was isolated by coagulation in stirred deionized water. The precipitated copolymer was also washed several times with deionized water remove the salts and then extracted in deionized water at 60° C. overnight. Finally, it was vacuum dried at 120° C. for 24 hours. Copolymers with other bisphenols and compositions were prepared via similar procedures. The homopolymer control from each respective bisphenol and DCDPS was similarly recovered by simple dilution filtration and precipitation in a methanol/water mixture (8/1 v/v) in a Waring blender.

Membrane preparation. The salt form of the random copolymers was redissolved in NMP to afford transparent solutions with 5% solids, and then the solutions were cast onto clean glass substrates. The films were dried for 2 days with infrared heat at gradually increasing temperatures, and then dried under vacuum at 110° C. for 2 days. The random copolymers of the membranes were converted to their acid form by boiling in 0.5 M $H_2SO_4$ for 2 hours, and were then boiled in deionized water for 2 hours.

Molecular transport through desalination (i.e., reverse osmosis (RO) or nanofiltration (NF)) membranes is diffusion-controlled due to the non-porous nature of the membrane selective layer. Transport through the membrane is typically described using the solution-diffusion model, which has three steps. In the first step, a molecule sorbs into the upstream (or high pressure) face of the membrane. Then, in the second step, the rate-determining step, the molecule diffuses down the chemical potential gradient across the membrane. Finally, the molecule desorbs from the downstream (i.e., low pressure) face of the membrane. The governing equation for the steady-state water flux in the solution-diffusion model is:

$$J_w = L_p(\Delta p - \Delta \pi) \quad (1)$$

where $J_w$ is the water flux through the membrane, $\Delta p$ is the transmembrane pressure difference, and $\Delta \pi$ is the osmotic pressure difference between the feed and the permeate. The proportionality constant, $L_p$, is the water permeability constant, and it depends on the physical characteristics of the membrane itself. $L_p$ is given by:

$$L_p = \frac{DSV}{RTl} \quad (2)$$

where D is the water diffusivity in the membrane, S is the water solubility in the membrane, V is the partial molar volume of water in the membrane, R is the gas constant, T is the temperature at which the water flux is measured, and l is the membrane thickness.

From equation 1, feed and permeate solution osmotic pressure enters the expression for water flux. For an ideal solution, with complete dissociation of salt ions, osmotic pressure is given by:

$$\pi = CRT \quad (3)$$

where $\pi$ is the osmotic pressure, C is the ion concentration, R is the ideal gas constant, and T is the solution temperature. The ion concentration, C, is the number of ions in solution per gram of water divided by the specific volume of water. Table 1 presents the osmotic pressures of several solutions pertinent to water treatment applications at 25° C. As seen in Table 1, the osmotic pressure of highly concentrated salt solutions is significant. A large osmotic pressure in the feed solution reduces the pressure driving force of the separation process and becomes an important variable in the transport mechanism.

TABLE 1

| Solute | Concentration (mg/L) | Osmotic Pressure (bar) |
|---|---|---|
| NaCl | 2,000 | 1.6 |
| NaCl | 35,000 | 27.4 |
| Brackish water | 2,000-5,000 | 1-2.7 |
| Seawater | 32,000 | 23.4 |

Unlike water flux, salt flux is independent of pressure. Based on the solution-diffusion model, the steady-state salt flux through the membrane is given by:

$$J_s = B(C_{feed} - C_{permeate}) \quad (4)$$

where $J_s$ is the salt flux through the membrane, $C_{feed}$ is the feed solution salt concentration, and $C_{permeate}$ is the permeate solution salt concentration. The difference between the feed and permeate salt concentrations is the driving force for salt transport through the membrane. The proportionality constant, B, is the salt permeance of the membrane. In the solution-diffusion model, B is given by:

$$B = \frac{D_s K_s}{l} \quad (5)$$

where $D_s$ is the salt diffusivity in the membrane, $K_s$ is the salt partition coefficient, and l is the membrane thickness. Salt permeability, $P_s$, is given by:

$$P_s = D_s K_s \quad (6)$$

Salt transport is often characterized in terms of salt rejection. Salt rejection, R, is defined by:

$$R(\%) = \left(1 - \frac{C_{permeate}}{C_{feed}}\right) \times 100\% \quad (7)$$

Salt passage is another term frequently used to characterize the ability of a membrane to reject salt. Salt passage (in percent) is 100−R(%).

Furthermore, water flux and salt flux are coupled. A mass balance relates water flux to salt flux:

$$\frac{C_w}{C_{permeate}} = \frac{J_w}{J_s} \quad (8)$$

where $C_w$ is the water concentration in the permeate, and $C_{permeate}$ is the salt concentration in the permeate.

Upon substituting equations 1 and 4 into equation 8 and rearranging, an analytical expression for salt rejection as a function of intrinsic membrane properties and operating conditions is obtained:

$$R = \left( \frac{\frac{L_p}{B}(\Delta p - \Delta \pi)}{1 + \frac{L_p}{B}(\Delta p - \Delta \pi)} \right) \times 100\% \quad (9)$$

Equation 9 is useful for calculating the expected separation performance of a membrane as a function of operating conditions and intrinsic membrane permeability to salt and water.

Figure 3:
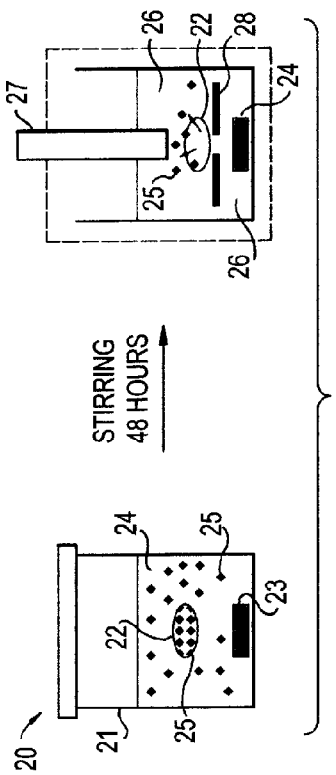
FIG. 3 is an apparatus for measuring salt diffusivity and solubility, from which salt permeability can be calculated.

An apparatus for measuring salt diffusivity, solubility and permeability using kinetic desorption is shown in FIG. 3. The apparatus 20 includes a container 21 in which a polymer membrane 22 and stir bar 23 are first soaked in a solution 24 containing salt (e.g., 5 wt %) long enough for the membrane 22 to absorb an equilibrium amount of salt 25 from the surrounding solution 24. Then, the surface of membrane 22 is blotted with laboratory tissue (not shown), to remove any salt 25 on the surface of the membrane 22, and the membrane 22 is placed in a container with a known amount of pure water 26 and a probe 27 (e.g., a conductivity sensor) that can measure the concentration of salt 24 in the water 26. The solution is stirred vigorously with the stir bar 24 positioned under the baffles 28.

Because the polymer membrane contains dissolved salt ions and the surrounding water does not, there is a gradual release of the salt ions from the membrane due to diffusion of the salt ions from the interior of the membrane to its surface and then desorption of the salt ions from the membrane surface into the surrounding solution, which is well-stirred to keep the salt concentration uniform in the liquid surrounding the polymer membrane. The salt concentration in the liquid surrounding the membrane is detected by the conductivity sensor. The release of the salt into the initially pure water obeys the laws of diffusion. The mathematical analysis of this experiment, which is used to extract salt solubility coefficients (i.e., salt partition coefficients) and salt diffusivity coefficients, is described in the text by Crank (The Mathematics of Diffusion, Oxford University Press).

Figure 4:
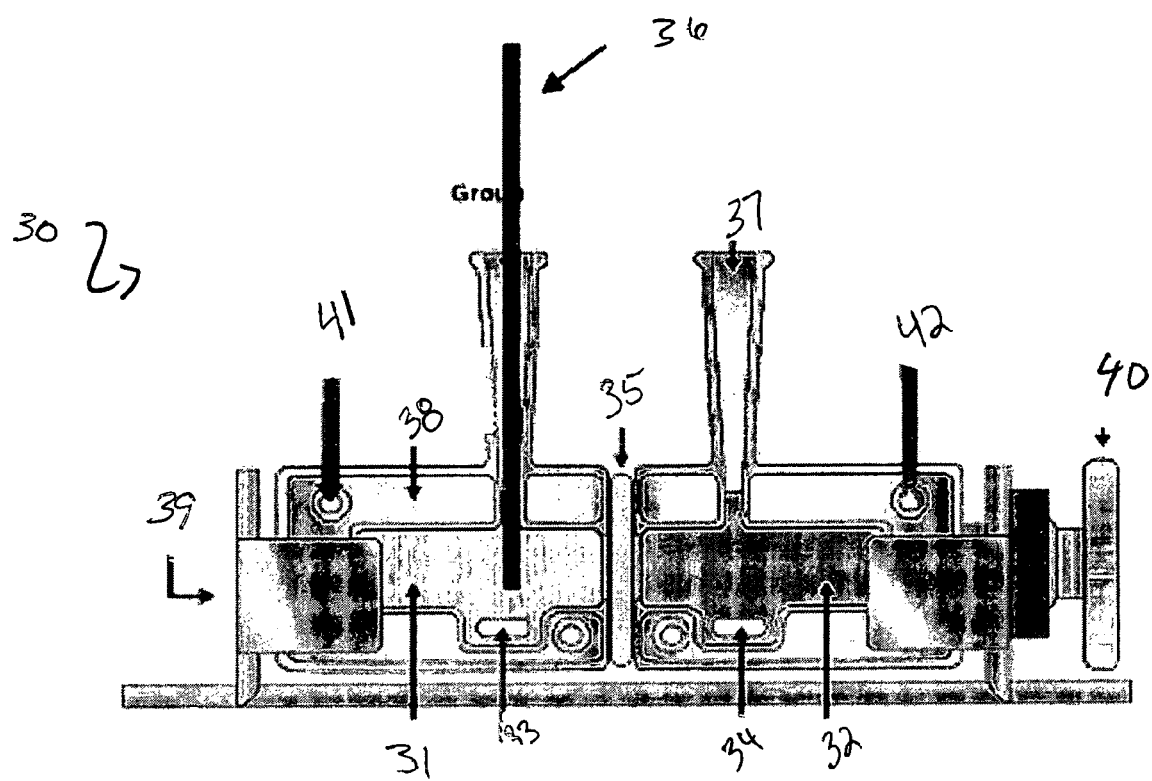
FIG. 4 is a diffusion cell apparatus for direct salt permeability measurement.

The salt permeability through the membranes can be determined from direct transport measurement using a custom-made two-chamber diffusion cell seen in FIG. 4. The two-chamber diffusion cell apparatus 30 includes a receptor chamber 31 and a donor chamber 32 each having a stir bar 33 and 34 that are separated by a membrane 35. The receptor chamber 31 includes a conductivity cell (or, equivalently, an appropriate ion selective electrode) 36 and the donor chamber 32 includes a ground joint port for analysis 37. The two-chamber diffusion cell apparatus 30 is surrounded by a water jacket 38 and includes a cell clamp 39 and a tension knob 40. The two-chamber diffusion cell apparatus 30 also includes heat circulators 41 and 42 connected to the water jacket 38. The volume of the receptor chamber 31 and the donor chamber 32 is about 35 mL each. A membrane 35 is clamped between the receptor chamber 31 and the donor chamber 32, and one is filled with the salt solution of interest (e.g., NaCl solution) and the other side is filled with deionized water. The liquid on both sides of the membrane 35 is stirred by magnetic stirrers 33 and 34. The concentration of NaCl is measured continuously by the conductivity cell or ion selective electrode positioned in the receptor chamber. Salt permeability is calculated from the following equation:

$$\text{Ln}\left[1 - 2\frac{\sigma_R(t)}{\sigma_D(0)}\right]\left[-\frac{Vd}{2A}\right] = Pt \quad (10)$$

where $\sigma_R(t)$ is the receptor conductivity at time t; $\sigma_D(t)$ is the donor initial conductivity; V is the donor and receptor volumes (cm$^3$); d is the membrane thickness (cm); A is the membrane area (cm$^2$); and P is the salt permeability (cm$^2$ sec$^{-1}$).

Figure 5:
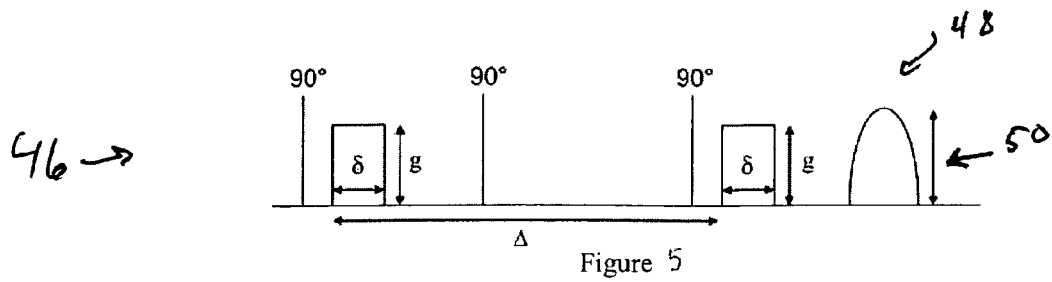
FIG. 5 is an illustration of a pulse sequence schematic for PGSE NMR.

Pulsed-Field Gradient Spin Echo Nuclear Magnetic Resonance. Water self diffusion coefficients were measured using a Varian Inova 400 MHz (for protons) nuclear magnetic resonance spectrometer with a 60 G/cm gradient diffusion probe. A total of 16 points were collected across the range of gradient strength and the signal to noise ratio enhanced by coadding four scans. The standard stimulated echo NMR pulse sequence for PGSE NMR is shown in FIG. 5. The pulse sequence schematic 46 includes observing the echo signal 48 and determining the echo signal intensity (A) 50 as a function of the gradient strength. The diffusion coefficient (D) was determined by fitting the data to equation 14, where A is the NMR signal intensity (A) as a function of gradient strength, γ is the gyromagnetic ratio (26,752 rad G$^{-1}$ s$^{-1}$ for protons), δ is length of the gradient pulse, Δ is the time between gradient pulse.[15,16]

$$A(g) = A(o) \exp[-\gamma^2 D g^2 \delta^2 (\Delta - \delta/3)] \quad (11)$$

Membrane samples of approximately 5 mm×15 mm×150 μm were equilibrated in liquid water for at least 24 hours. The samples were removed from the liquid water, blotted to remove droplets, quickly inserted into the NMR tube, and immediately measured over a span of about 5 min. Measurements were repeated by reimmersing the sample in DI water, waiting at least 30 minutes, and then repeating the transfer and measurement process. Separate measurements were collected with different times between the gradient pulses.

NMR spectroscopy and intrinsic viscosity. $^1$H and $^{19}$F NMR analysis were conducted on a Varian Unity 400 spectrometer. All spectra were obtained from a 10% solution (w/v) in a DMSO.d6 solution at room temperature. Intrinsic viscosities were determined in 0.05M LiBr NMP at 25° C. using a Cannon Ubbelholde viscometer.

Figure 6:
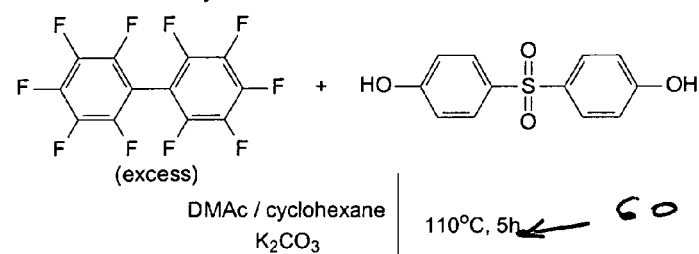
FIG. 6 is a synthesis scheme for BisSF hydrophobic oligomers.
Figure 6:
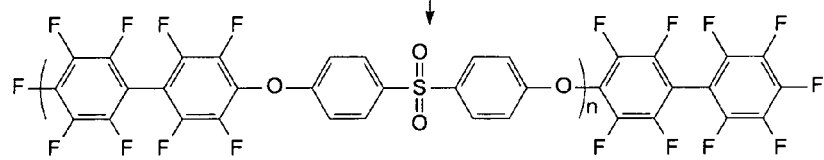

Synthesis of telechelic oligomers and multi-block copolymers. FIG. 6 is a schematic illustrating the synthetic scheme for BisSF hydrophobic oligomers. The synthetic scheme 52 includes synthesis of multi-block or segmented copolymers by the step or condensation polymerizations of telechelic oligomers bearing appropriate end-groups and molecular weights. As shown in FIG. 6, fluoro-terminal BisSF oligomers 54 were obtained by polymerizing excess decafluorobiphenyl 56 and bisphenol-S 58. The reaction proceeded readily reaction conditions 60 and at 110° C. thanks to the highly reactive perfluorinated monomer.

Figure 7:
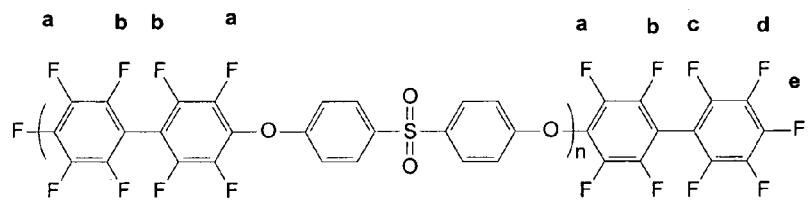
FIG. 7 is an image of a NMR spectrum of a BisSF oligomer.
Figure 7:
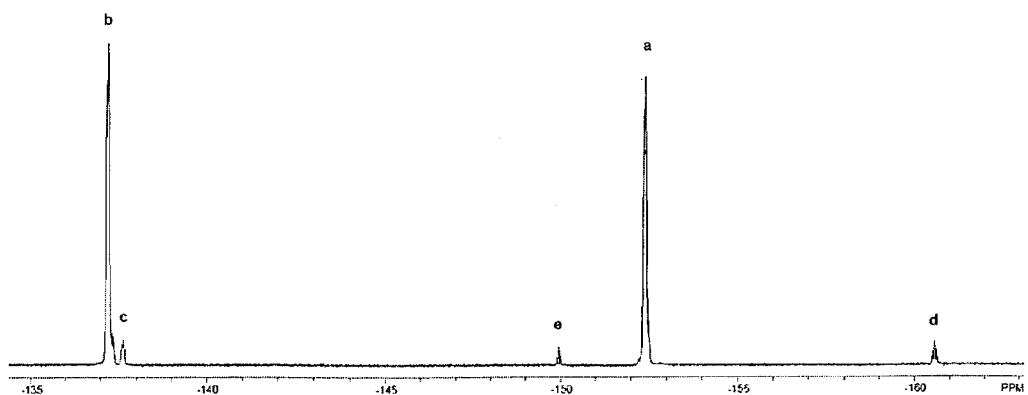

FIG. 7 is an image of a $^{19}$F NMR spectrum of a BisSF oligomer. The NMR spectrum image 62 of BisSF oligomer 54 includes the peaks a-e which correspond to the positions indicated on the BisSF oligomer 54. The $M_n$ of the oligomers can be calculated based on the integrals of the peaks due to main chains and end-groups, and were found to be in decent agreement with the target values.

Figure 8:
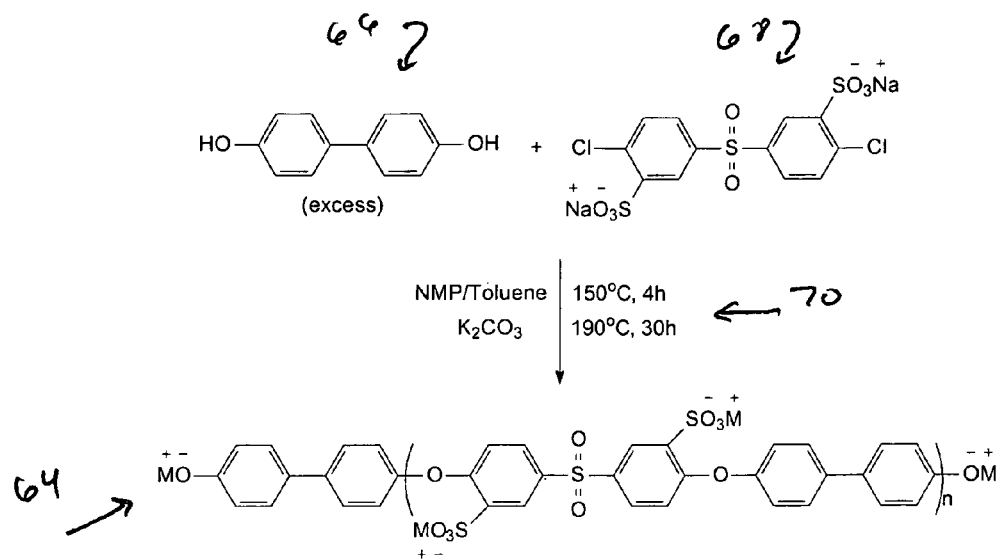
FIG. 8 is a synthesis scheme for BPS100 hydrophilic oligomers.
Figure 9:
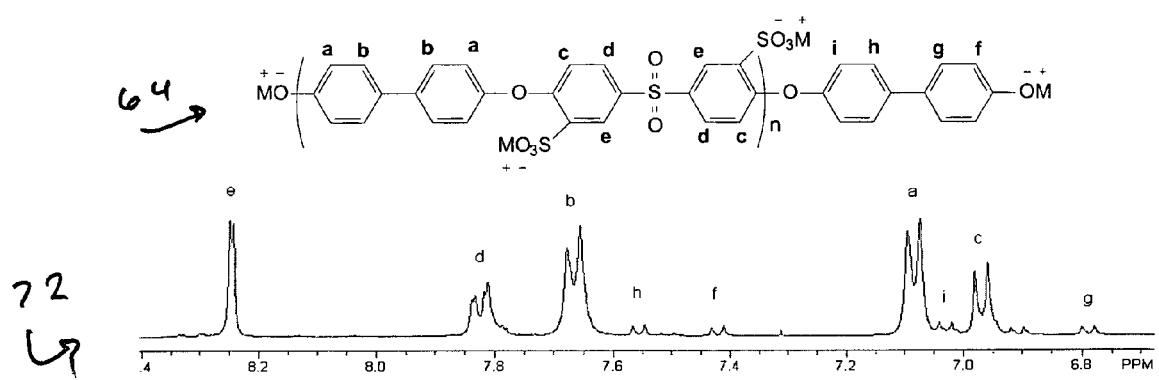
FIG. 9 is an image of a NMR spectrum of a BPS100 oligomer.

FIG. 8 is a reaction schematic for the synthetic scheme for the formation of BPS100 hydrophilic oligomers. Fully disulfonated BPS-100 oligomers 64 were formed by the polymerization of Biphenol 66 and SDCDPS 68 under conditions 70. About a 1 to 2 mol % excess of SDCDPS 68 relative to the calculated amount was usually used to compensate for its impurity, caused by the inevitable presence of salt and/or water. FIG. 9 is an image 72 of a $^1$H NMR spectrum of a BPS-100 oligomer 64. The image 72 indicated peaks for the corresponding hydrogens on the BPS-100 oligomer 64.

Figure 10:
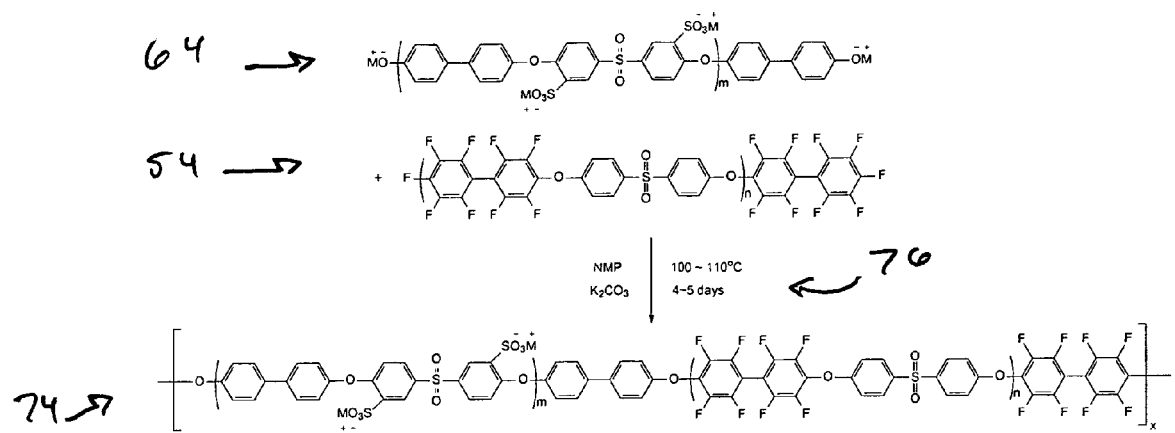
FIG. 10 is a synthesis scheme of BisSF-BPSH multi-block copolymers.

FIG. 10 is a synthetic scheme of the synthesis of BisSF-BPSH multi-block copolymers. The synthesis of a multi-block copolymer 74 requires that the telechelic oligomers 54 and 64 be readily reactive toward each other and able to form stable linkages under the reaction conditions 76. The use of the highly reactive fluorinated oligomers 54 enables the block copolymerizations to be conducted at a much lower temperature than the non-fluorinated systems (about 110° C. vs. about 180° C.). This helps minimize the possibility of the ether-ether interchange process, which could lead to randomized architectures.

Figure 11A:
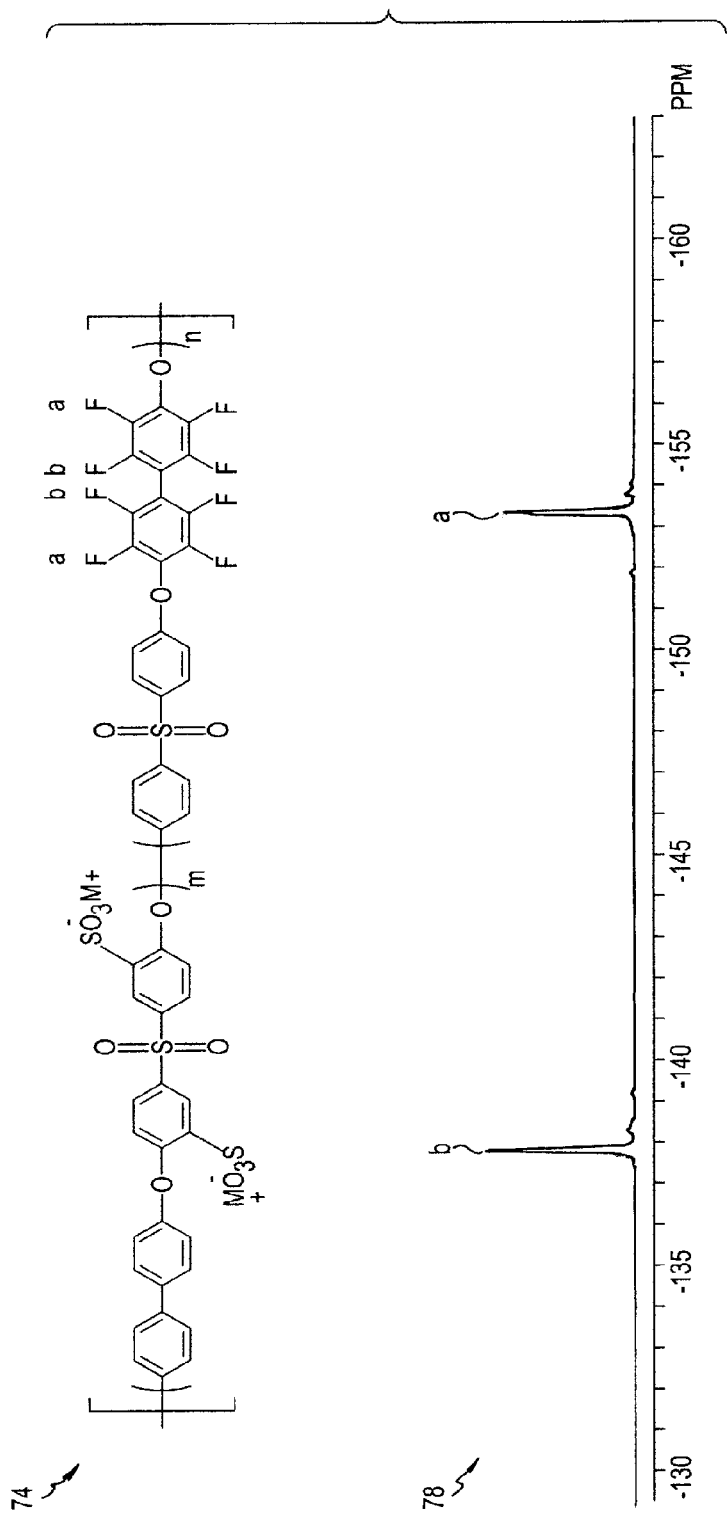
FIGS. 11A and 11B are NMR spectrums of a BisSF-BPSH hydrophilic-hydrophobic multi-block copolymer.
Figure 11B:
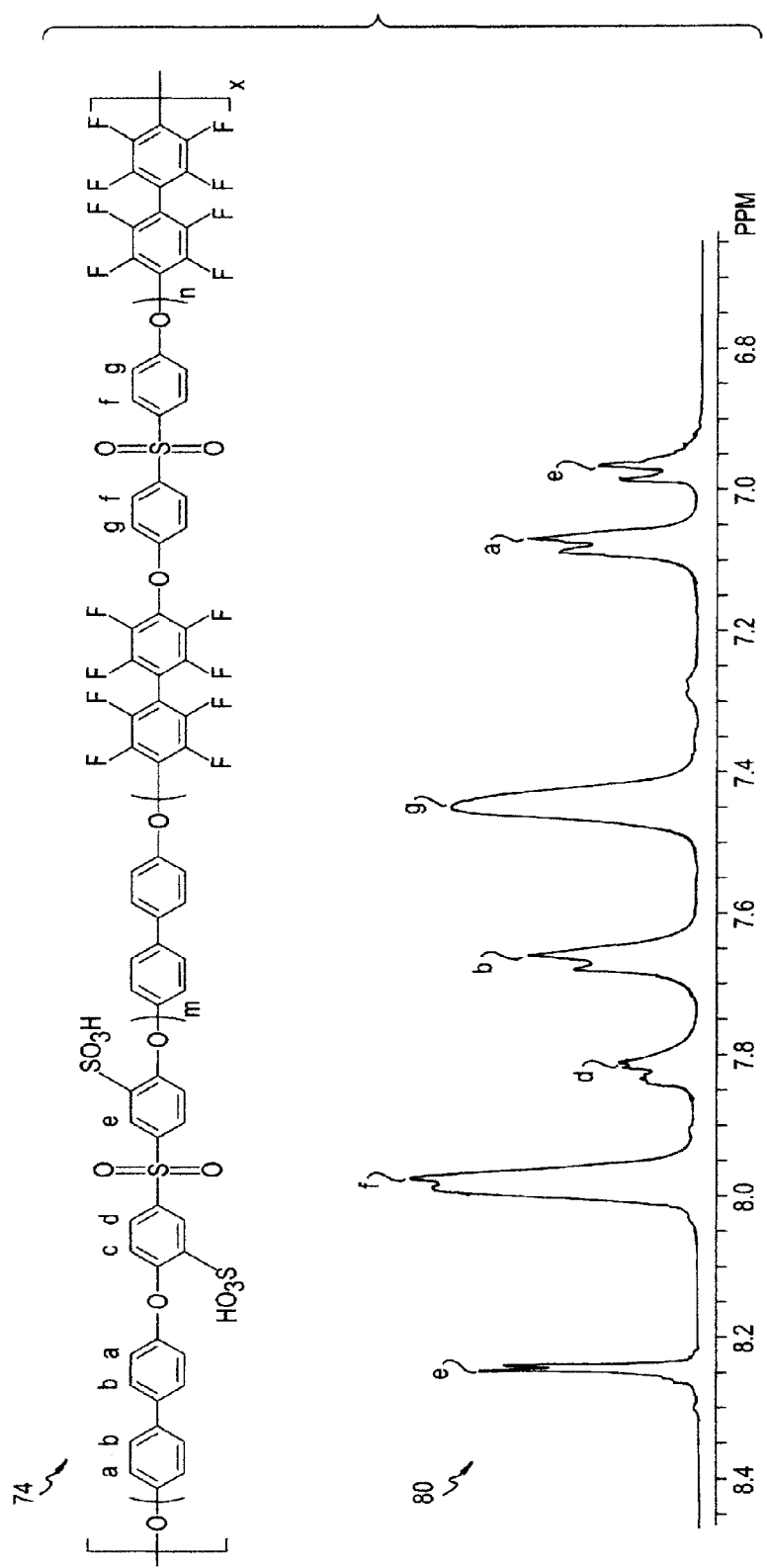

FIGS. 11A and 11B are images of NMR spectra for the BisSF-BPSH multi-block copolymer 74. FIG. 11A is an image of a $^{19}$F NMR spectra 78 of a multi-block copolymer 74, while FIG. 11B is an image of a $^1$H NMR spectra 80 of a multi-block copolymer 74. Here the peaks due to end-groups in the cases of BisSF and BPS100 oligomers are not observed; they either disappeared as in FIG. 11A or shifted as in FIG. 11B illustrating a high conversion of the coupling reaction. In FIG. 11B, the small peak 82 at about 7.3 ppm is assigned to the linkages between fluorinated and sulfonated blocks.

Figure 12:
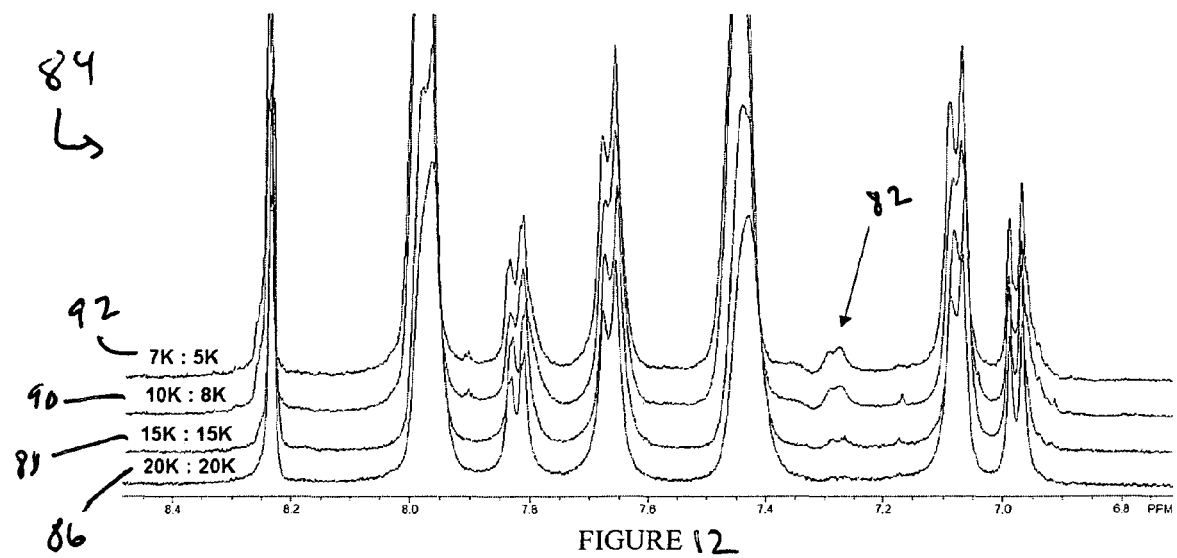
FIG. 12 is a NMR spectrum of BisSF-BPSH copolymers with increasing block lengths.

FIG. 12 is an overlaid image of a $^1$H NMR spectra of BisSF-BPSH copolymers with increasing block lengths. The image of the NMR spectrum 84 indicate BisSF-BPSH copolymers with increasing block lengths 20K:20K 86; 15K:15K 88; 10K:8K 90; and 7K:5K 92. With the other peaks normalized, it can be observed that, as the block lengths increase, the intensity of the small peak 82 at about 7.3 parts per million gradually becomes smaller. This is consistent with the fact that, in multi-block copolymers, the longer the segments are, the smaller number of linkages would exist in each copolymer chain. Therefore, the hydrophilic and hydrophobic sequences were preserved and not randomized.

The block lengths, molar feed ratios, intrinsic viscosity and ion exchange capacities (IEC) of the BisSF-BPSH copolymers are summarized in Table 2. As reflected in the molar ratios, an excess of the BisSF hydrophobic oligomer were used in the syntheses of all the multi-block copolymers. It seems that these coupling reactions of oligomers are more tolerant to the stoichiometric imbalance than condensation polymerizations of small monomers, because all the resulting copolymers showed reasonable intrinsic viscosities and were capable of forming tough and ductile membranes. Thus, the feed ratios, as well as the block lengths, are variables that can be tailored to certain extents in order to control the IEC and hence the swelling behavior of the multi-block copolymers.

TABLE 2

Characterizations of BisSF-BPSH multi-block copolymers

| Hydrophobic/ Hydrophilic Block Lengths (g/mol) | Molar Feed Ratio | η (dL/g)[a] | Target IEC | IEG by $^1$H NMR |
|---|---|---|---|---|
| 5K:5K   | 1:0.59 | 0.64 | 1.3 | 1.31 |
| 7K:5K   | 1:0.86 | 0.92 | 1.3 | 1.33 |
| 7K:7K   | 1:0.57 | 0.85 | 1.3 | 1.20 |
| 15K:10K | 1:0.84 | 0.75 | 1.3 | 1.25 |
| 17K:12K | 1:0.77 | 1.00 | 1.3 | 1.32 |
| 15K:15K | 1:0.63 | 1.26 | 1.3 | 1.45 |
| 20K:20K | 1:0.60 | 0.89 | 1.3 | 1.41 |

[a]Measured at 25° C. in 0.05M LiBr/NMP

Characterization of multi-block copolymer membranes. The multi-block copolymers synthesized were characterized on the basis of water uptake and self-diffusion coefficients of water. For copolymers with similar hydrophobic and hydrophilic block lengths (5K-5K, 10K-8K and 15-15K), water uptake or the hydration number is found to increase with increasing block lengths. The 17K-12K and 15K-10K samples, for instance, show a significant decrease in water uptake compared to the 15K-15K sample: the increased fraction of the hydrophobic block length seems to restrict the water absorption. Ion-containing copolymers are known to phase separate into hydrophilic and hydrophobic domains. The extent of phase separation has been found to increase with increasing block lengths in the case of block copolymers.[9,18] The self-diffusion coefficient of water was found to increase with increasing block lengths, with the 15K-15K sample showing the highest value.

Figure 13A:
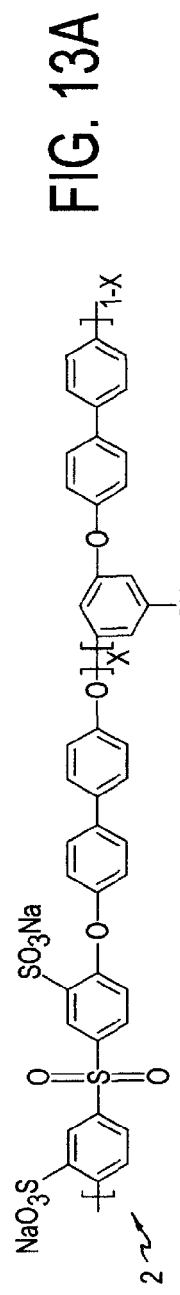
FIGS. 13A-13H illustrate different embodiments of the sulfonated hydrophilic-hydrophobic random copolymer.

FIGS. 13A-13H are images that illustrates the structures of sulfonated hydrophilic-hydrophobic random copolymers. FIG. 13A represents a general sulfonated hydrophilic-hydrophobic random copolymer 2 containing a hydrophilic region 4 and a hydrophobic region 6. The general sulfonated multi-block copolymer 2 may be modified by the skilled artisan to incorporate various groups listed herein. The hydrophilic region 4 is contains "x" repeats, while the hydrophobic region 6 contains "1-X" repeats. For example, "x" may be between about 0.2 and about 0.6. The entire sulfonated hydrophilic-hydrophobic random copolymer 2 is repeated "n" times. The sulfonated hydrophilic-hydrophobic random copolymer 2 may be called a sulfonated poly(arylene ether benzonitrile) or "PAEB-XX," where XX indicates the mole percentage, e.g., 10, 20, 30, 35, 40, 45, 50, 60 and 70 mol %.

Figure 13B:
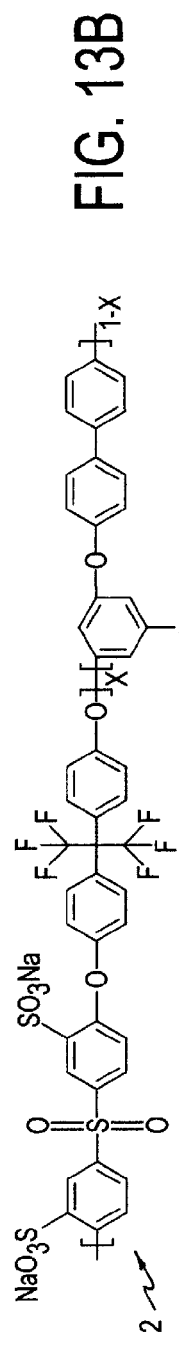

FIG. 13B represents a general sulfonated hydrophilic-hydrophobic random copolymer 2 containing a hydrophilic region 4 and a hydrophobic region 6 (also a sulfonated poly (arylene ether benzonitrile or "PAEB-XX")) and includes XX that indicates the mole percentage, e.g., 10, 20, 30, 35, 40, 45, 50, 60 and 70 mol %. The sulfonated hydrophilic-hydrophobic random copolymer 2 may be modified by the skilled artisan to incorporate various groups listed herein. The hydrophilic region 4 is contains "X" repeats, while the hydrophobic region 6 contains "1-X" repeats. For example, "X" may be about 0.35. The entire sulfonated hydrophilic-hydrophobic random copolymer 2 is repeated "n" times. In addition, the amount of fluorination of the polymer can be controlled by the amount of fluorinated monomer. For example, the amount of biphenol and 1,1-di(trifluoromethane)(diphenylmethane) can be used to control the amount of fluorination in the copolymer.

Figure 13C:
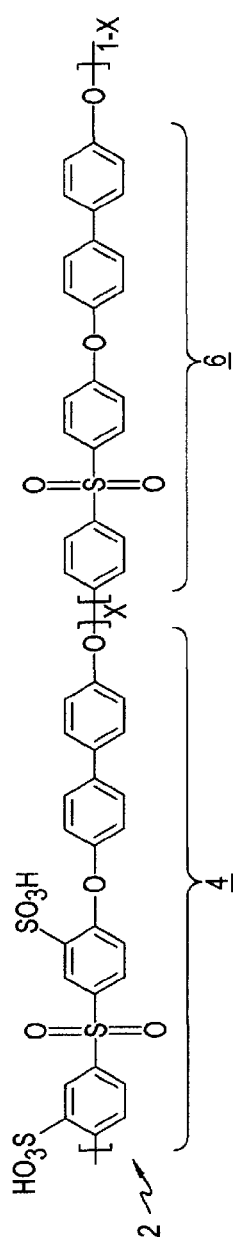

FIG. 13C represents a sulfonated hydrophilic-hydrophobic random copolymer 2 containing a hydrophilic region 4 and a hydrophobic region 6. The sulfonated hydrophilic-hydrophobic random copolymer 2 may be modified by the skilled artisan to incorporate various groups listed herein. The hydrophilic region 4 is contains "x" repeats, while the hydrophobic region 6 contains "x-1" repeats, e.g., "x" may be between about 0.2 and about 0.4. The entire sulfonated hydrophilic-hydrophobic random copolymer 2 is repeated "n" times. The general sulfonated hydrophilic-hydrophobic random copolymer 2 may be called a sulfonated poly(arylene ether sulfone) or "BPS-XX," where XX indicates the mole percentage, e.g., 10, 20, 30, 35, 40, 45, 50, 60 and 70 mol %. In addition, the molecule may be in the acidic form or the salt form as needed.

Figure 13D:
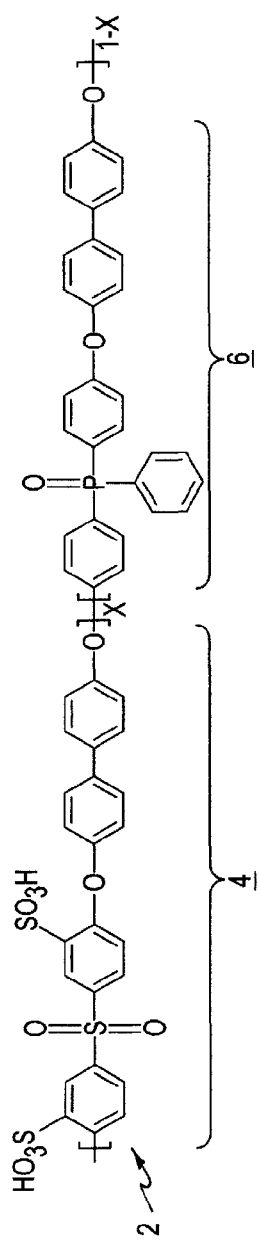
Figure 13E:
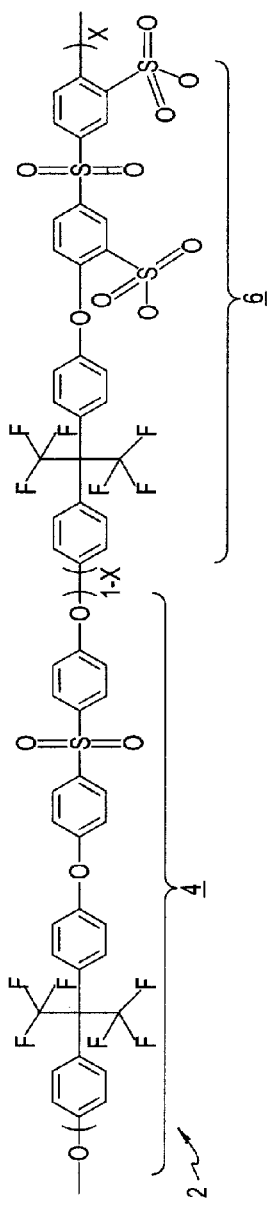
Figure 13F:
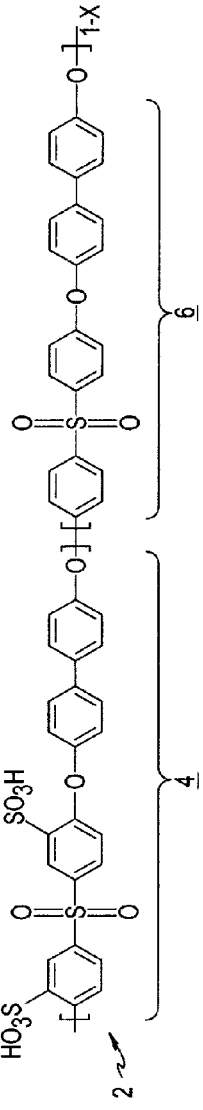

FIGS. 13D-13E represents a general sulfonated hydrophilic-hydrophobic random copolymer 2 containing a hydrophilic region 4 and a hydrophobic region 6. The sulfonated hydrophilic-hydrophobic random copolymer 2 of FIGS. 13D and 13E are abbreviated as "PA-XX" and "BPS-XX" respectively, where XX indicates the mole percentage, e.g., 10, 20, 30, 35, 40, 45, 50, 60, and 70 mol %.

Figure 13G:
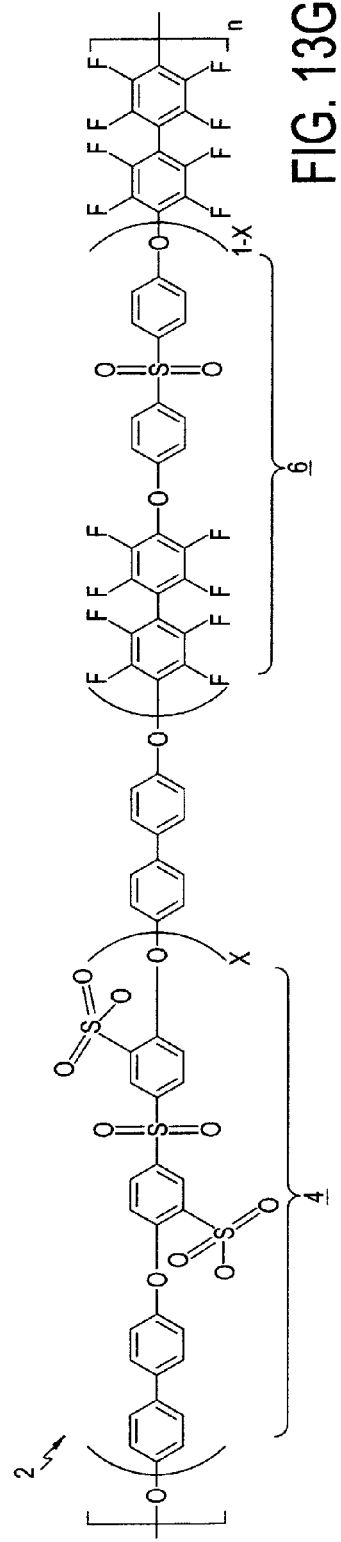
Figure 13H:
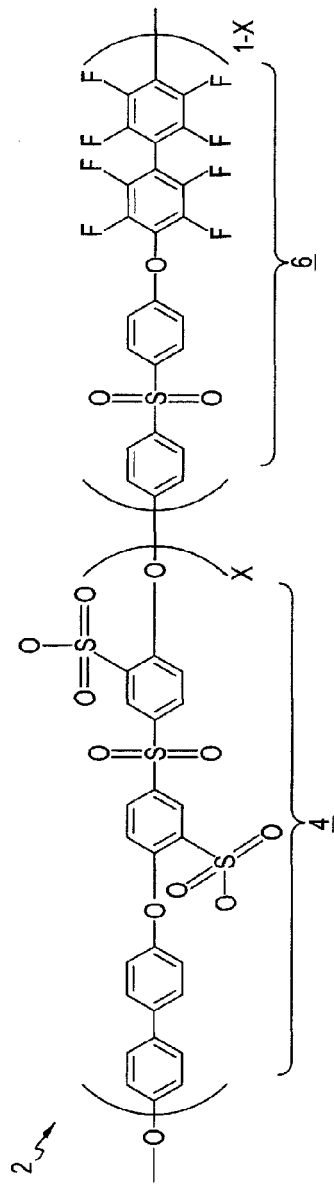

FIG. 12F represents a sulfonated hydrophilic-hydrophobic random copolymer 2 containing a hydrophilic region 4 and a hydrophobic region 6 that may be used to form a membrane useful in the removal of arsenic. The general sulfonated hydrophilic-hydrophobic random copolymer 2 may be modified by the skilled artisan to incorporate various groups listed herein. The hydrophilic region 4 is contains "x" repeats, while the hydrophobic region 6 contains "1-X" repeats. The entire sulfonated hydrophilic-hydrophobic random copolymer 2 is repeated as necessary. The sulfonated hydrophilic-hydrophobic random copolymer 2 may be called a sulfonated poly (arylene ether sulfone) or "BPS-XX," where XX indicates the mole percentage, e.g., 10, 20, 30, 35, 40, 45, 50, 60 and 70 mol %. In addition, the molecule may be in the acidic form or the salt form as needed. FIGS. 13G and 13H represents copolymers that have been modified by the substitution or addition of other atoms (e.g., fluorine) to the sulfonated hydrophilic-hydrophobic random copolymer. FIG. 13G is a BisSF-BPSH multi-block copolymer structure.

Determination of water uptake. The water uptake of all membranes was determined gravimetrically. First, the membranes were soaked in water at 25° C. for 2 days after acidification. Wet membranes were removed from the liquid water, blotted dry to remove surface droplets, and quickly weighed. The membranes were then dried at 120° C. under vacuum for at least 24 hours and weighed again. The water uptake of the membranes was calculated according to equation (12) where $mass_{dry}$ and $mass_{wet}$ refer to the mass of the dry membrane and the wet membrane, respectively.

$$\lambda = \frac{(mass_{wet} - mass_{dry})/MW_{H_2O}}{IEC \times mass_{dry}} \quad (12)$$

The hydration number ($\lambda$), number of water molecules absorbed per sulfonic acid, can be calculated from the mass water uptake and the ion content of the dry copolymer as shown in equation (13), where $MW_{H2O}$ is the molecular weight of water (18.01 g/mol) and IEC is the ion exchange capacity of the dry copolymer in equivalents per gram.

$$\text{water uptake \%} = \frac{mass_{wet} - mass_{dry}}{mass_{dry}} \times 100 \quad (13)$$

The water uptake and intrinsic viscosities of the various mol. percent (20-60%) disulfonated poly(arylene ether benzonitrile or "PAEB-XX" are listed below, with XX as the degree of disulfonation.

| Copolymer PAEB-XX | Water uptake of the Salt form in (weight percent) | Viscosity (dL/g) |
| --- | --- | --- |
| PAEB-20 | 10 | 1.9 |
| PAEB-35 | 20 | 0.8 |
| PAEB-45 | 40 | 0.8 |
| PAEB-60 | NA | 0.9 |

Figure 14C:
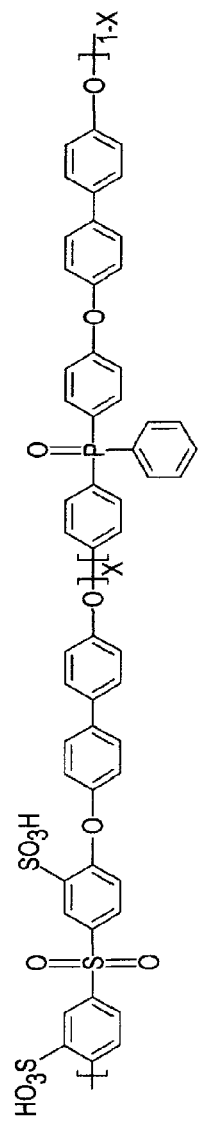

FIG. 14A is tables comparing the properties of sulfonated hydrophilic-hydrophobic random copolymer in the acid form (H) and the salt form (N). The sulfonated hydrophilic-hydrophobic random copolymer includes BPSH 40 in FIG. 14B and PAH 40 in FIG. 14C. The structure of BPSH-40 and PAH-40 are illustrated the acid form. The salt form is not shown. The table in FIG. 14A compares the water permeability, NaCl rejection, and NaCl permeability of the acid and salt versions of the BPS 40 and PA 40. FIG. 14D is a table that compares the water permeability, rejection, and permeability of the various percentages of cellulose acetate, aromatic polyamide and the acidic and the salt (i.e., NaCl) form of the sulfonated hydrophilic-hydrophobic random copolymer.

Figure 15A:
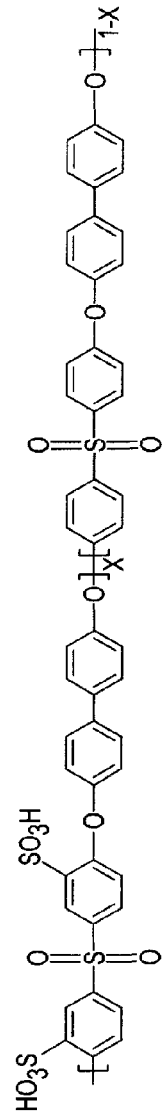
FIG. 15A illustrates the general structure of the sulfonated hydrophilic-hydrophobic random copolymer and FIGS. 15B-15G are graphs characterizing the sulfonated hydrophilic-hydrophobic random copolymer.
Figure 14B:
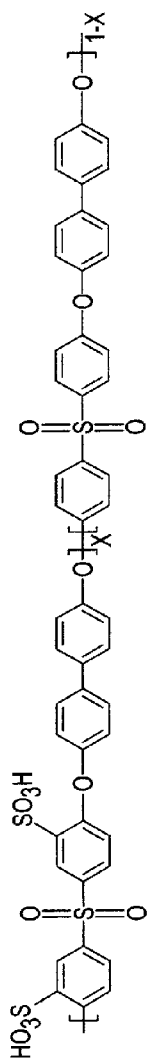

FIGS. 15A-15G contains various plots and graphs used to characterize sulfonated poly(arylene ether sulfone) or "BPS" molecules of different mole percents. For example, the basic structure of the sulfonated hydrophilic-hydrophobic random copolymer BPS-XX is illustrated in FIG. 15A. The characteristics of the sulfonated hydrophilic-hydrophobic random copolymer are illustrated in FIG. 14B, a graph of water permeability versus percent water uptake; FIG. 15C, a graph of percent water uptake versus IEC; FIG. 15D, a graph of water permeability versus percent sodium chloride rejection versus ion exchange capacity ("IEC" for sulfonated hydrophilic-hydrophobic random copolymer "BPS" molecules of different mole percents 20, 30 and 40; FIG. 15E, a graph of water permeability for various "BPS" molecules of different mole percents 20, 30 and 40; FIG. 15F, a chart of the NaCl diffusivity for various sulfonated hydrophilic-hydrophobic random copolymer "BPS" molecules of different mole percents 30, 35 and 40; and FIG. 15G, a chart of NaCl solubility (i.e., partition coefficient) for various sulfonated hydrophilic-hydrophobic random copolymer "BPS" molecules of different mole percents (i.e., 30, 35 and 40) of sulfonated monomer.

The sulfonated hydrophilic-hydrophobic random copolymer may be compared by examining the NaCl diffusivity, solubility and permeability before and after chlorine exposure, as seen in Table 3. Table 3 compares sulfonated hydrophilic-hydrophobic random copolymer (BPS) having different mole percents 35 and 40 (e.g., BPS-35 and BPS-40) in both the acid form (H) and the salt form (N).

TABLE 3

| | Diffusivity $D \times 10^6$ (cm²/sec) | Solubility K | Permeability $P \times 10^6$ (cm²/sec) |
|---|---|---|---|
| ACID FORM | | | |
| BPS 40H (control) | 4.2 | 0.28 | 1.2 |
| BPS 40H (pH = 4, 1000 ppm Cl)* | 4.3 | 0.29 | 1.3 |
| BPS 40H (pH = 10, 1000 ppm Cl) | 4.2 | 0.28 | 1.2 |
| BPS 35H (control) | 1.4 | 0.064 | 9.0 |
| BPS 35H (pH = 4, 1000 ppm Cl)* | 1.6 | 0.063 | 10.1 |
| BPS 35H (pH = 10, 1000 ppm Cl)* | 1.4 | 0.063 | 8.8 |
| Na+-SALT FORM | | | |
| BPS 40N (control) | 1.8 | 0.11 | 2.0 |
| BPS 40N (pH = 4, 1000 ppm Cl) | 2.0 | 0.15 | 3.0 |
| BPS 40N (pH = 10, 1000 ppm Cl) | 1.9 | 0.13 | 2.5 |
| BPS 35N (control) | 3.5 | 0.033 | 1.2 |
| BPS 35N (pH = 4, 1000 ppm Cl)* | 3.7 | 0.036 | 1.3 |
| BPS 35N (pH = 10, 1000 ppm Cl)* | 3.6 | 0.034 | 1.2 |

In addition, the sulfonated random copolymers may be compared by examining the dry and wet densities, the water uptake and the hydration, as seen in Table 4. Table 4 compares sulfonated hydrophilic-hydrophobic random copolymer (BPS) having different mole percents 20, 30, 35 and 40 (e.g., BPS-20, BPS-30, BPS-35 and BPS-40) in both the acid form (H) and the salt form (N).

TABLE 4

| | Dry density$^a$ (g/cm³) | Wet density$^b$ (g/cm³) | Water uptake$^c$ (%) | Hydration$^d$ (%) |
|---|---|---|---|---|
| BPS 20N | 1.324 | 1.338 | 4.5 | 4.3 |
| BPS 30N | 1.349 | 1.331 | 9.1 | 8.4 |
| BPS 35N | 1.353 | 1.324 | 12.3 | 11.0 |
| BPS 40N | 1.358 | 1.312 | 17.3 | 14.8 |
| BPS 20H | 1.353 | 1.288 | 18.1 | 15.3 |
| BPS 30H | 1.370 | 1.277 | 30.7 | 23.5 |
| BPS 35H | 1.386 | 1.262 | 39.7 | 28.4 |
| BPS 40H | 1.420 | 1.229 | 59.5 | 37.3 | where the dry densities is at 25° C. and the wet densities is at 25° C. The percent water uptake is given by the equation $$\frac{W_{wet} - W_{dry}}{W_{dry}} * 100$$

and the percent hydration is given by the equation $$\frac{W_{wet} - W_{dry}}{W_{dry}} * 100.$$

Figure 16:
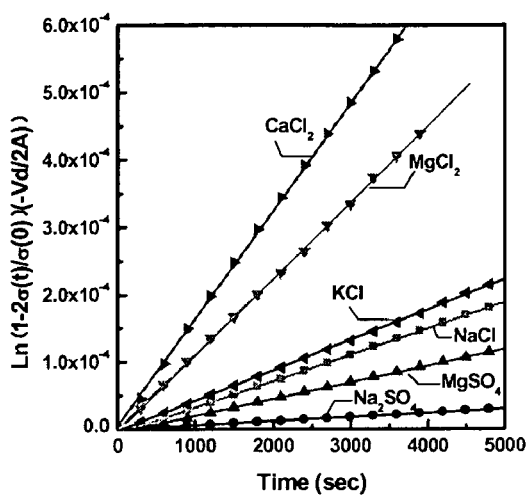
FIGS. 16A and 16B are graphs used to characterize salt permeability of sulfonated hydrophilic-hydrophobic random copolymer.
Figure 16:
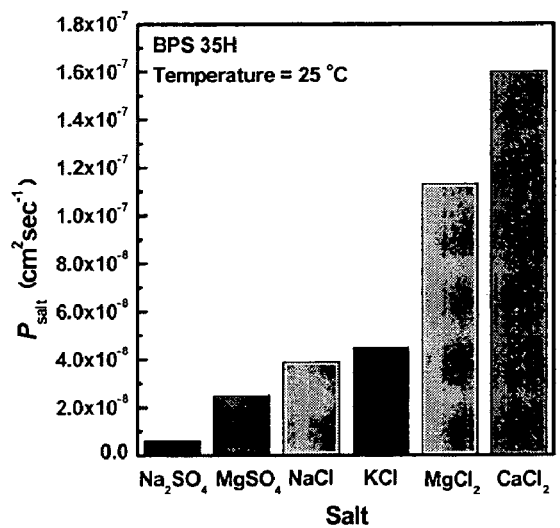
Figure 17:
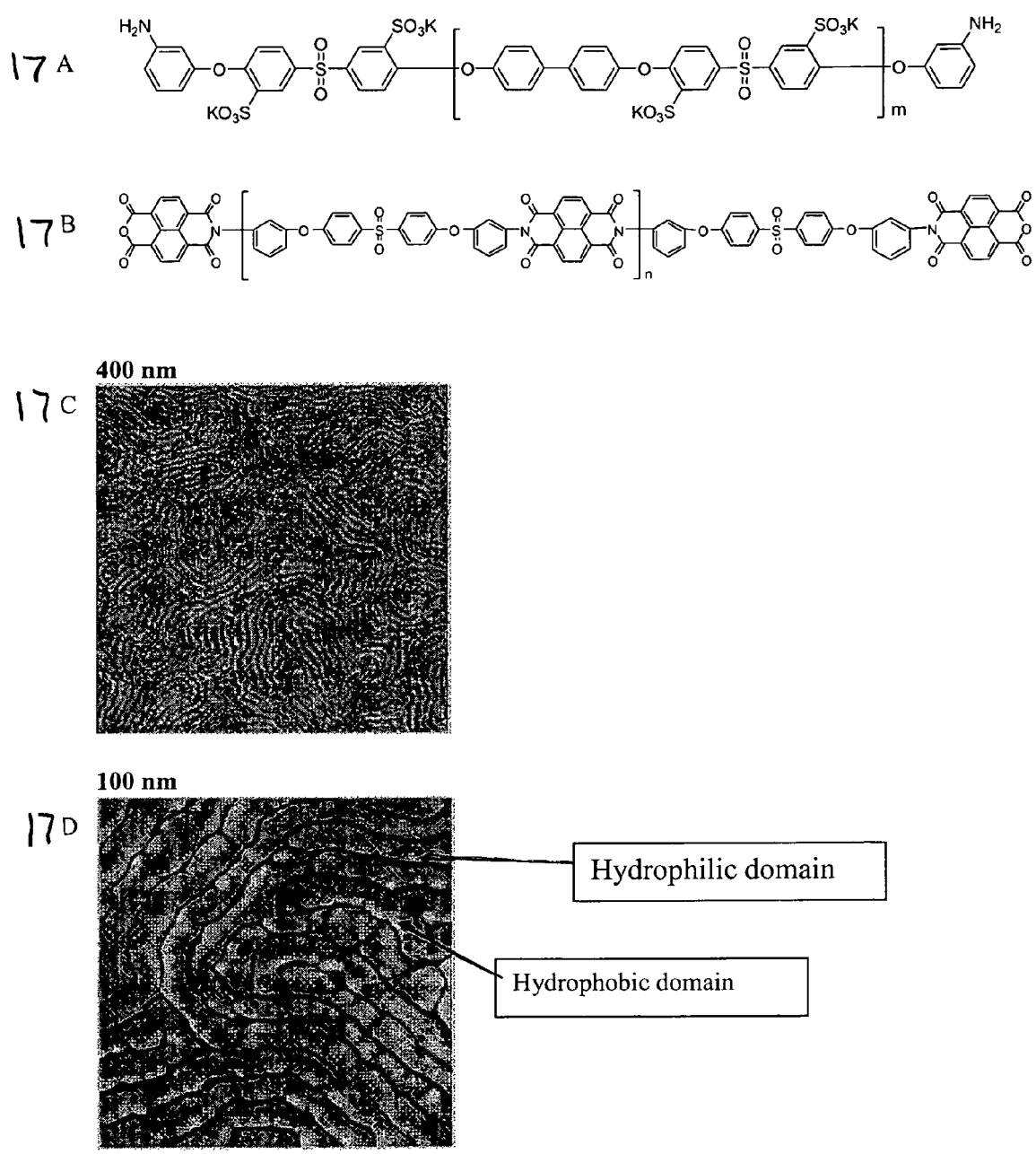
FIGS. 17A and 17B are schematics of sulfonated hydrophilic-hydrophobic block copolymers.
FIG. 17C to FIG. 17D are atomic force microscopy images of the sulfonated hydrophilic-hydrophobic block copolymers.

FIGS. 16A-16B are graphs used to characterize salt permeability of sulfonated poly(arylene ether sulfone) "BPS". FIG. 16A shows data used to determine salt permeability coefficients. The graphs show that the salt permeability trend is $Na_2SO_4 < MgSO_4 < NaCl < KCl > MgCl_2 < CaCl_2$ and the salt rejection trend is $Na_2SO_4 > KCl > NaCl > MgSO_4 > MgCl_2 > CaCl_2$.

Figure 17E:
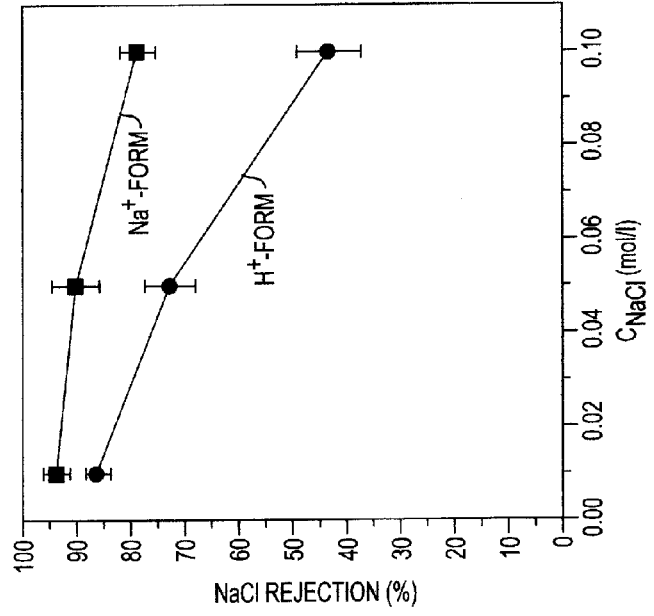
FIG. 17E is a graph of the water and salt transport of sulfonated hydrophilic-hydrophobic block copolymers.
Figure 15:
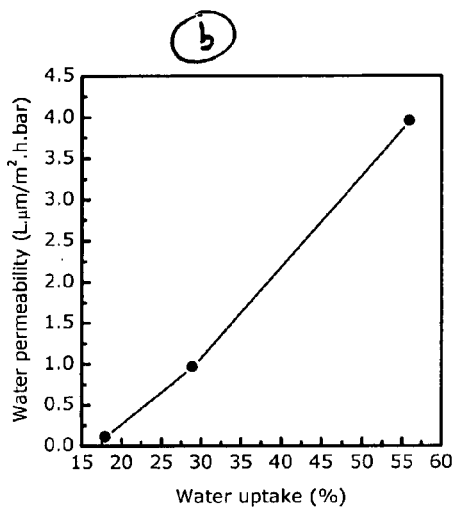
Figure 15:
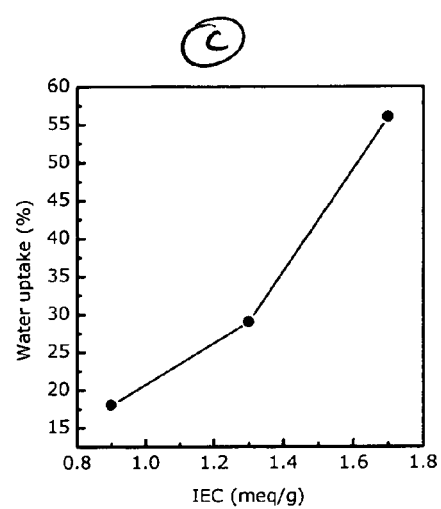
Figure 15:
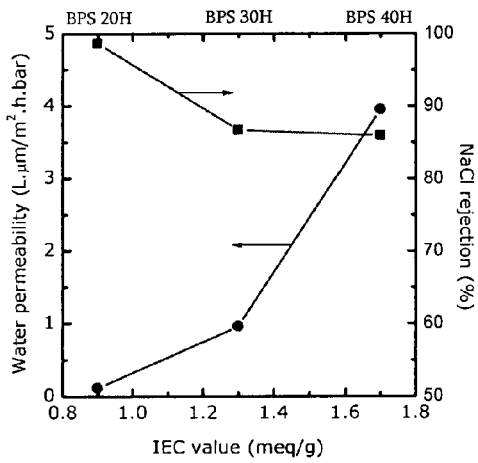
Figure 15:
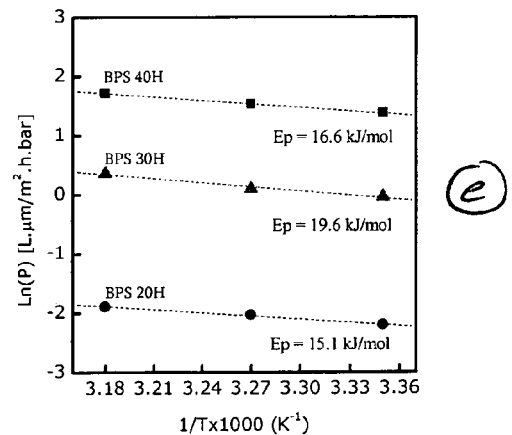
Figure 15:
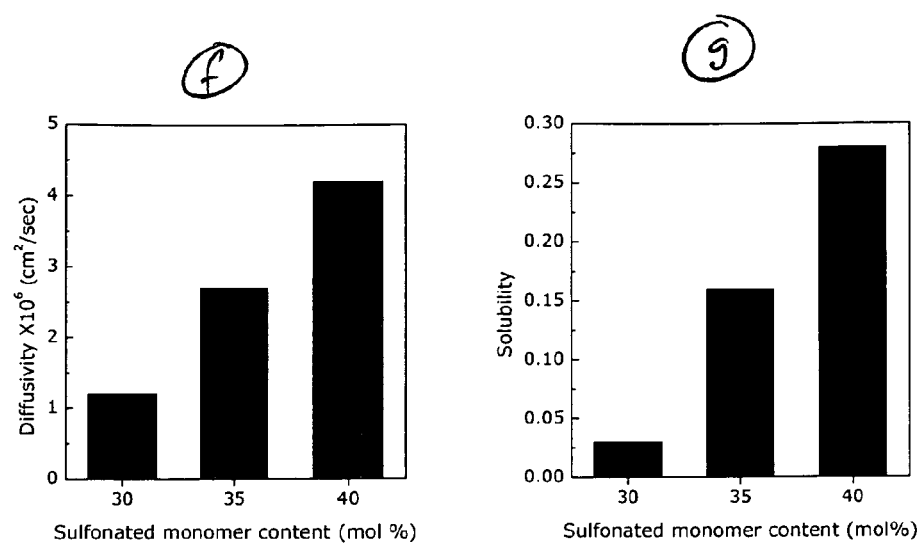

The present invention also provides a hydrophilic-hydrophobic multi-block copolymers shown in FIG. 17A is a block-sulfonated poly(arylene ether sulfone) and FIG. 17B is a block-polyimide copolymer. The hydrophilic-hydrophobic multi-block copolymers includes the hydrophilic block-sulfonated poly(arylene ether sulfone) copolymer and the hydrophobic block-polyimide copolymer. The polymers may have repeating subunits m and n, where m and n are between 0.01 and 19 or more, e.g., 0, 1, 2, 3, 4, 5, 6, 7, 8, 9, 10, 11, 12, 13, 14, 15, 16, 17, 18, 19 or more. The block-sulfonated poly(arylene ether sulfone) of FIG. 17A may be combined with the hydrophobic block-polyimide copolymer of FIG. 17B (under conditions of NMP 180° C., 1) Benzoic acid for 24 hours and 2) Isoquinoline for 24 hours) to produce a (poly arylene ether sulfone)$_x$ (polyimide)$_y$ polymer. Although, the specific imide is given as an example, the skilled artisan will know that other imides may be selected to yield the desired polymer. The image of the hydrophobic block-polyimide seen in FIGS. 17C and 17D are magnified and the scale given. From the images of the hydrophilic and hydrophobic regions can be seen in the images of FIGS. 17C and 17D. The water and salt transport in hydrophilic-hydrophobic multi-block copolymers may be examined by comparing the water permeability and the water uptake as seen in the graph of FIG. 17E and Table 5.

TABLE 5

| | Water permeability (L · μm/(m² · h · bar)) | Water uptake (%) |
|---|---|---|
| BPSH-PI (acid) | 10.0 | 51.4 |
| BPS 40H (acid) | 4.0 | 59.5 |
| BPSH-PI (salt) | 2.1 | 15.2 |
| BPS 40N (salt) | 0.9 | 17.3 |

FIG. 17E is a graph of the water and salt transport in the hydrophilic-hydrophobic multi-block copolymers includes the hydrophilic block-sulfonated poly(arylene ether sulfone) copolymer and the hydrophobic block-polyimide copolymer using a Dead-end cell, Feed Pressure.

Similarly, the water and salt transport can be examined in sulfonated hydrophilic-hydrophobic random copolymer (BPS) having different mole percents 30, 35 and 40 (e.g., BPS-35 and BPS-40) in both the acid form (H) and the salt form (N) by comparing the percent water uptake, the water permeability and NaCl salt permeability constant as seen in Table 6.

TABLE 6

| Polymer | Water uptake (%) | $A_w$ cm³/ (cm² 1] sec · bar) | $B_s$ cm/sec |
|---|---|---|---|
| BPS 40H | 59.5 | $4.9 \times 10^{-5}$ | $9.1 \times 10^{-5}$ |
| BPS 40N | 17.3 | $7.1 \times 10^{-6}$ | $7.1 \times 10^{-6}$ |
| BPS 30H | 30.7 | $2.5 \times 10^{-5}$ | $2.5 \times 10^{-5}$ |
| BPS 30N | 9.1 | $3.8 \times 10^{-6}$ | $3.8 \times 10^{-6}$ |
| PAEB 35H | 26.1 | $1.7 \times 10^{-5}$ | $3.3 \times 10^{-5}$ |
| PAEB 35N | 12.3 | $5.3 \times 10^{-6}$ | $5.3 \times 10^{-6}$ |
| Cellulose Acetate | NA | $9.9 \times 10^{-6}$ | $6.9 \times 10^{-6}$ |
| Aromatic Polyamide | NA | $2.4 \times 10^{-5}$ | $1.7 \times 10^{-6}$ |

Where the $A_w$ is the water permeability constant given by $J_w = A_w(\Delta P - \Delta \pi)$ and $B_s$ is the salt permeability constant given by $J_s = B_s(C_f - C_p)$. The state of water in sulfonated poly(arylene ether sulfone) for the sulfonated poly(arylene ether sulfone) given the structure found in FIG. 13E is shown in Table 7.

TABLE 7

| | Ion Exchange Capacity (IEC) (meq/g) | Water Uptake (%) | No. of water molecules per sulfonic acid group, λ | | | |
|---|---|---|---|---|---|---|
| | | | Total water | Non-freezing water | Freezing bound water | Free water |
| BPS 20H | 0.9 | 18 | 10.5 | 3.5 | 7.0 | 0 |
| BPS 30H | 1.3 | 31 | 11.9 | 4.0 | 7.9 | 0 |
| BPS 35H | 1.5 | 40 | 13.9 | 4.5 | 9.4 | 0 |
| BPS 40H | 1.7 | 59 | 18.2 | 5.4 | 10.5 | 2.3 |

Figure 18:
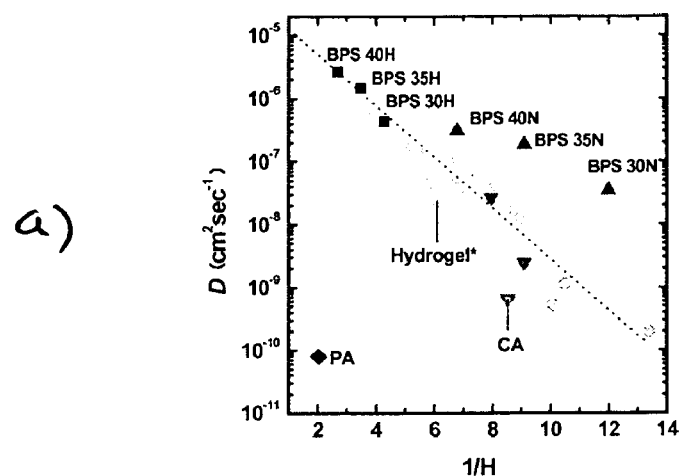
FIGS. 18A-18C are graphs that illustrate the effect of hydration on NaCl diffusivity, NaCl solubility and NaCl permeability for sulfonated hydrophilic-hydrophobic block copolymers having different chemical structures.
Figure 18:
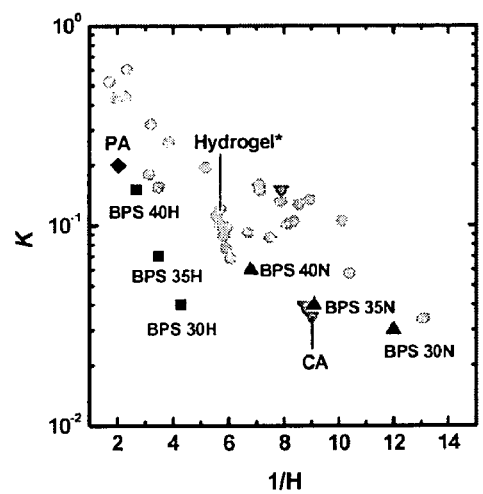
Figure 18:
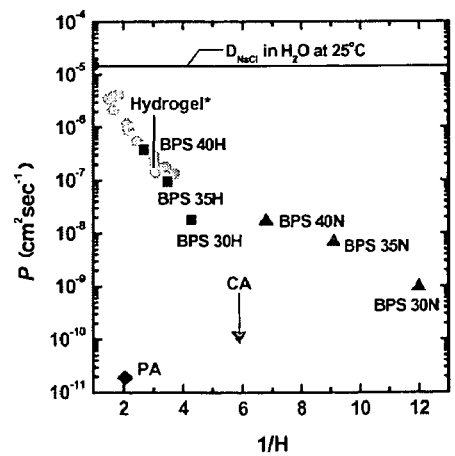

FIGS. 18A, 18B and 18C are graphs that illustrate the effect of hydration on NaCl diffusivity, NaCl solubility and NaCl permeability for sulfonated poly(arylene ether sulfone) of different compositions and structures. As the chemical structure changes, the amount of water that the polymer absorbs changes. FIGS. 18A, 18B and 18C compare the properties of sulfonated hydrophilic-hydrophobic random copolymer (BPS) having different chemical structures, different compositions and different mole percents (e.g., BPS-35 and BPS-40). In addition, both the acid form (H) and the salt form (N) sulfonated hydrophilic-hydrophobic random copolymer are examined. Hydration (H) is essentially the volume fraction of water absorbed by the polymer. The graphs of FIGS. 18A, 18B and 18C illustrate that the NaCl diffusion coefficients, partition coefficients, and permeability coefficients depend significantly on the amount of water that the polymers absorb.

FIG. 18A is a graph that illustrates the effect of hydration on NaCl diffusivity for sulfonated poly(arylene ether sulfone) of different compositions and chemical structures. FIG. 18B is a graph that illustrates the effect of hydration on NaCl solubility for sulfonated poly(arylene ether sulfone) of different compositions and chemical structures. FIG. 18C is a graph that illustrates the effect of hydration on NaCl permeability for sulfonated poly(arylene ether sulfone) of different compositions and chemical structures.

Figure 19:
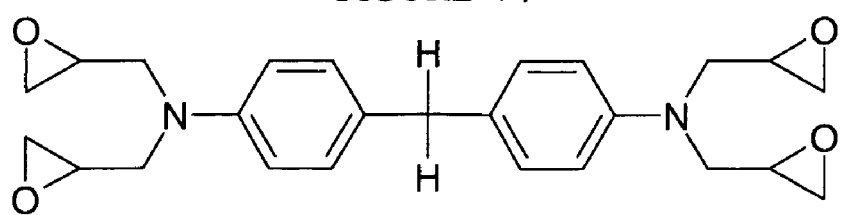
FIG. 19 is a tetrafunctional epoxy resin for cross-linking the BPS-xx copolymers.

In addition, the present invention provides the use of a tetrafunctional epoxy resin (e.g., Tetraglycidyl bis-(p-aminophenyl)methane as seen in FIG. 19) for cross-linking the BPS-xx copolymers. The skilled artisan will recognize other compounds may be used for cross-linking with other functional groups and it is not necessary for the functional groups to be identical. The present invention provides cross-linking units that are thermally stable without the need for endcapping the BPS copolymer.

Figure 20:
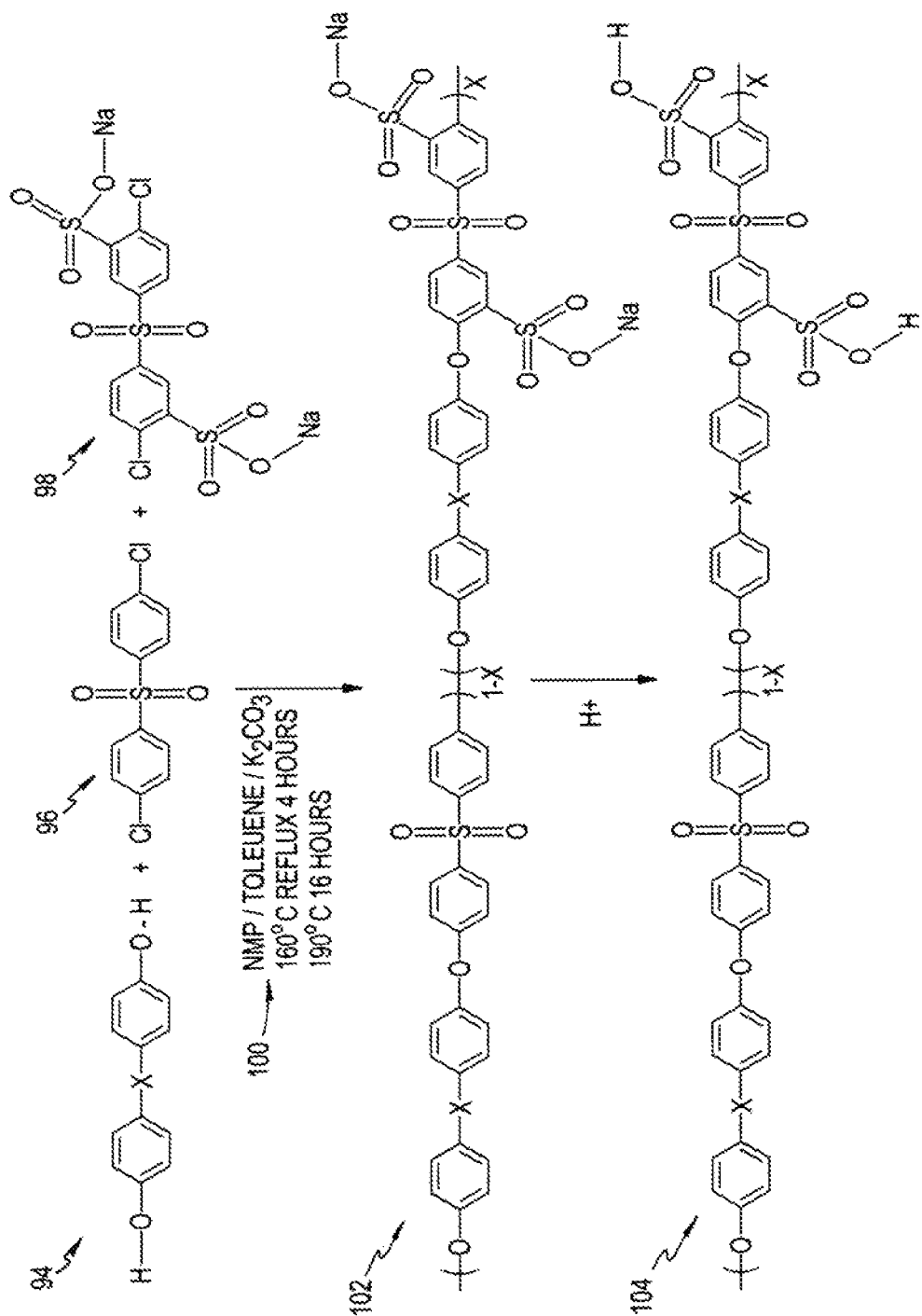
FIG. 20 is a schematic of the synthesis of phenoxide terminated BPS-xx copolymer.

FIG. 20 is schematics of the synthesis of phenoxide terminated BPS-xx copolymer. The biphenol 94, the 4,4 dichloro diphenyl sulfone 96, and the disodium 3,3'-disulfonate-4,4'-dichlorodiphenyl sulfone 98 are mixed under reaction conditions 100 to form the salt form of the hydrophobic block-polyimide copolymer 102. The polymer 102 may include repeating units x and 1-x. The polymer 102 is then treated with acid to form the acid form of the hydrophobic block-polyimide copolymer 104.

TABLE 8

| Copolymer | Target Mn (kg/mol) | Mn (kg/mol) (1H NMR) | Mn (kg/mol) (GPC/light scattering) | IV* (dL · g−1) | IEC (meq/g) | | |
|---|---|---|---|---|---|---|---|
| | | | | | Target | 1H NMR | Titration** |
| BPS50 5k | 5 | 4.40 | 8.3 | 0.20 | 2.08 | 2.01 | — |
| BPS50 15k | 15 | 16.5 | 19.9 | 0.36 | 2.08 | 2.01 | 1.83 |

TABLE 8-continued

| Copolymer | Target Mn (kg/mol) | Mn (kg/mol) (1H NMR) | Mn (kg/mol) (GPC/light scattering) | IV* (dL·g−1) | IEC (meq/g) Target | 1H NMR | Titration** |
|---|---|---|---|---|---|---|---|
| BPS50 20k | 20 | 20.8 | 21.8 | 0.43 | 2.08 | 2.03 | 1.90 |

The polymers (e.g., BPS50) were also cross-linked using Tetraglycidyl bis-(p-aminophenyl)methane as seen in Table 9.

TABLE 9

| Polymer | Epoxy (Tetraglycidyl bis-(p-aminophenyl) methane) Conc.(wt %) | Catalyst (Triphenyl phosphine) Conc.(wt % on basis of epoxy) | Curing Time at Cure Temp. of 150° C. |
|---|---|---|---|
| BPS50 (~5k) | 9 | 1-3 | 120 min |

Figure 21:
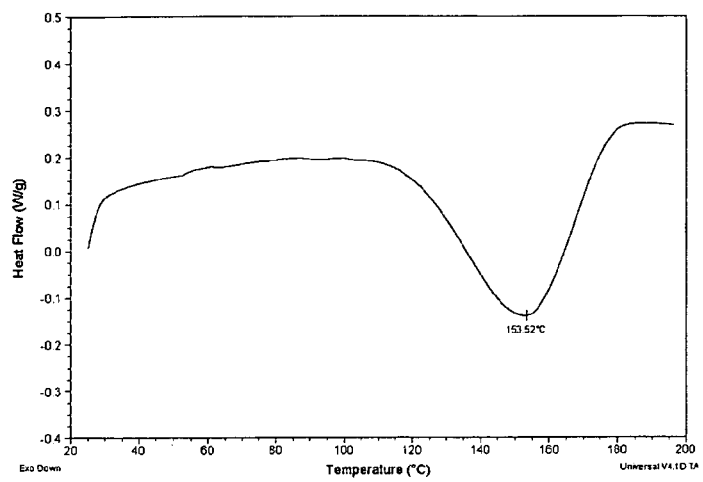
FIGS. 21A-21C are plots characterizing the phenoxide terminated BPS-xx copolymer.
Figure 21:
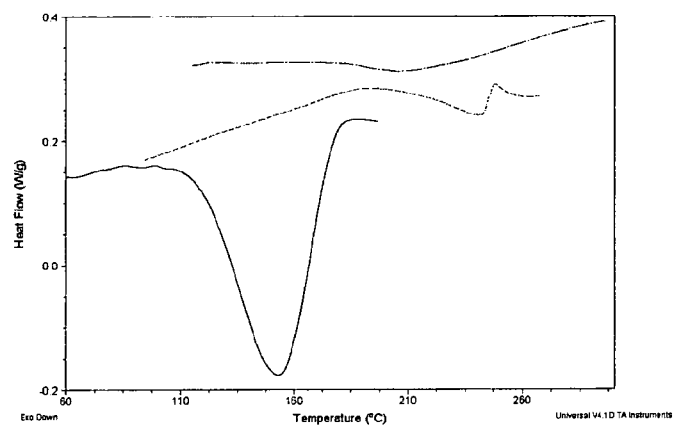
Figure 21:
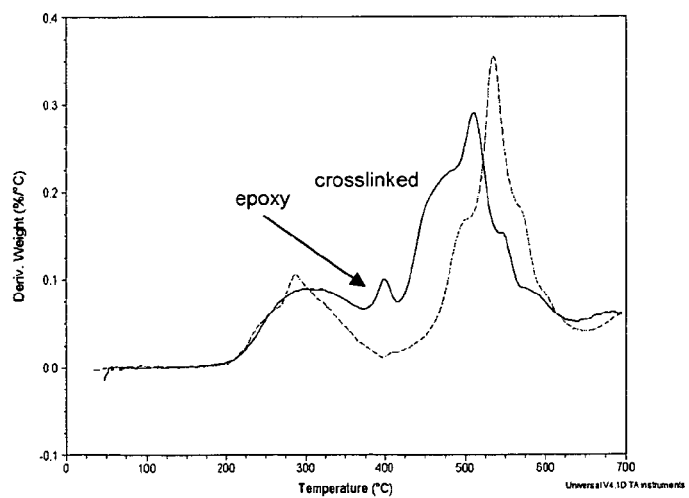
Figure 22:
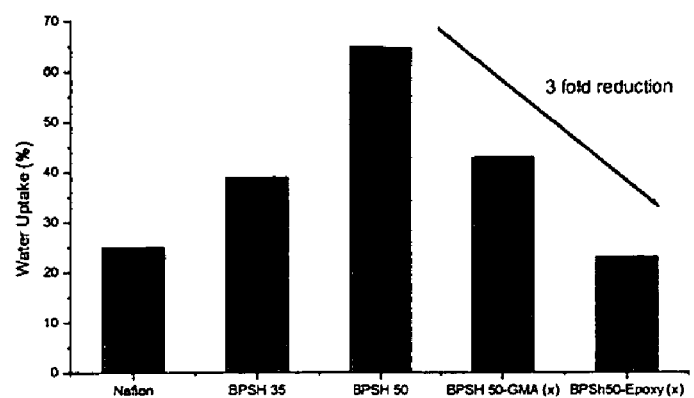
FIG. 22 is a graph characterizing water uptake as a function if polymer structure.

The polymers were then cast into films from about 15 weight percent solution in N-Methyl-2-Pyrrolidone (NMP), dried at 100° C. for 2 hours under vacuum, dried under IR lamp for 3 hours and cured at 150° C. for 2 hours. The epoxy-x-linked BPS 50 polymer exhibited a distinct curing exotherm at about 150° C., as seen in FIG. 21A. FIG. 21B is a curing exotherm as a function of heating cycles and FIG. 21C is a plot of the weight as a function of temperature and shows the epoxy cross-link. Linkage is stable up to 400° C. under an air atmosphere. FIG. 22 is a graph of the water uptake for polymers of various structures. A significant drop in water uptake is observed for the epoxy-x-linked system, e.g., a 3 fold reduction is seen when compared to the BPSH-50.

FIG. 23A is a schematic of the acid form of the sulfonated hydrophilic-hydrophobic random copolymer having different mole percents 40 (e.g., and BPS-40). FIG. 23B is a plot of the membrane performance under continuous exposure to free chlorine for sulfonated hydrophilic-hydrophobic random copolymer (BPS-40) in both the acid form ((BPS-40H) and the salt form ((BPS-40N). The commercial seawater reverse osmosis membrane from Dow FilmTec (e.g., SW30HR) is also plotted as a control.

Membrane performance is often evaluated using cross-flow filtration, which is more typical of industrial operating conditions than dead end filtration. The operating pressure may be varied over a convenient range; pressures from less than 100 psig to more than 400 psig have been tested, and the cross-flow flow rate may also be varied; it is typically maintained at 227 L/hr (1.0 gpm), which corresponds to a Reynolds number of 4700. Feed is recycled to the feed tank, and recovery, the ratio of product flow rate to feed flow rate, is kept below 0.1%. Feed temperature is maintained at 25° C. with a NesLab RTE 7 circulating bath (Thermo Electron Corporation, Waltham, Mass.), and feed pH is adjusted to 6.5-7.5 using 5% NaOH solution. Mass as a function of time is continuously recorded via a LabView (National Instruments, Austin, Tex.) program connected to electronic balances permits monitoring of product flux during an experiment. Water permeance, $L_p$ (cf., equation 2), is determined by first collecting a permeate sample for a given length of time. The sample mass and conductivity are measured along with the feed solution conductivity. Permeate volume, V, as a function of time, t, is recorded, and water flux $J_w$, is calculated using the following equation:

$$J_W = \frac{\Delta V}{\Delta t}\frac{1}{A} \quad (14)$$

where A is the active membrane area. Ultrapure water from a Millipore MilliQ system (18.2 MΩ, 1.2 ppb) is used in all experiments. Feed solutions for RO testing contain 2000 mg/L NaCl solutions, and feed and permeate salt concentrations are measured using an Oakton 100 Conductivity meter (Cole Parmer, Vernon-Hills, N.J.).

The permeate and feed conductivities are used to calculate salt rejection using equation 5 and osmotic pressure difference using equation 4. Then, the calculated water flux and osmotic pressure difference are used in equation 1 to calculate $L_p$.

Figure 24:
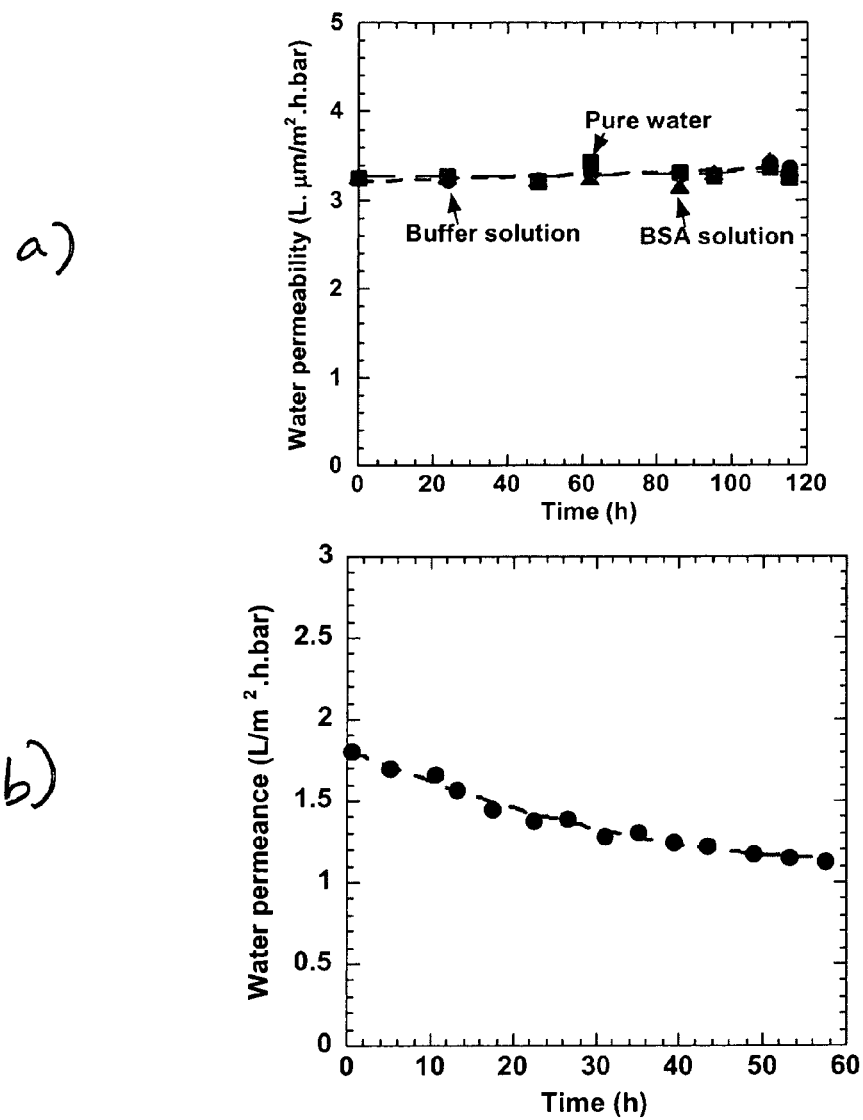
FIGS. 24A and 24B are graphs of the fouling of a commercial AG reverse osmosis membrane and sulfonated hydrophilic-hydrophobic random copolymers of the present invention by proteins.

FIG. 24A is a graph of the fouling of a commercial AG reverse osmosis membrane (e.g., GE Osmonics) by protein (bovine serum albumin, BSA) using a Dead-end cell. FIG. 24B is a graph of the fouling of a sulfonated hydrophilic-hydrophobic random copolymer having different mole percents 40 (e.g., BPS-40) reverse osmosis membrane by protein (bovine serum albumin, BSA) using a Dead-end cell.

High-pressure dead-end filtration measurements are performed using Sterlitech high-pressure cells at pressures of 14.8-28.6 bar (200-1000 psig) (HP4750, Sterlitech Corporation, Kent, Wash.). Permeate volume, V, as a function of time, t, is recorded, and water flux $J_w$, is calculated using equation 10. Ultrapure water from a Millipore MilliQ system (18.2 MΩ, 1.2 ppb) is used in all experiments. Feed solutions for RO testing often contain 2000 mg/L NaCl solutions, and feed and permeate salt concentrations are measured using an Oakton 100 Conductivity meter (Cole Parmer, Vernon-Hills, N.J.). However, other NaCl concentrations can be used, and salts other than NaCl can be employed in this test.

Salt solubility and diffusivity are measured using kinetic desorption experiments. Salt permeabilities may be estimated from the product of salt diffusivity and salt solubility. An advantage of these experiments (relative to direct permeation measurements) is that kinetic desorption experiments are insensitive to pinholes and defects in the films that can compromise a direct permeation measurement. As such, desorption experiments provide fundamental transport data without requiring the preparation of thin, defect-free samples, which are required for direct permeation measurements.

Figure 25:
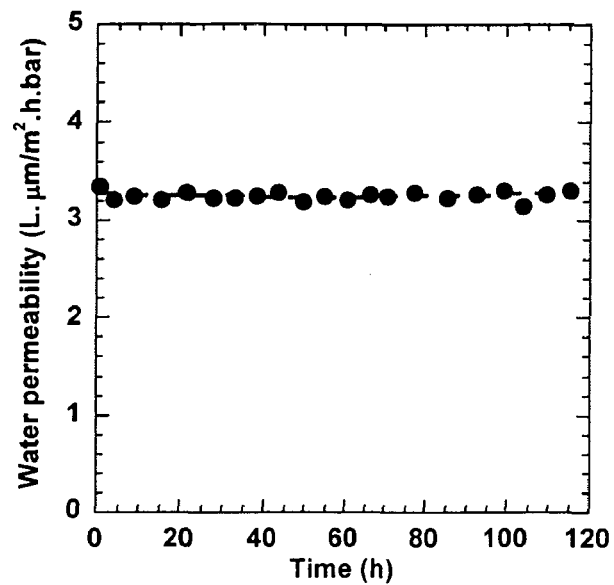
FIGS. 25A and 25B are graphs of the fouling of a commercial AG reverse osmosis membrane and sulfonated hydrophilic-hydrophobic random copolymers of the present invention by oily water.
Figure 25:
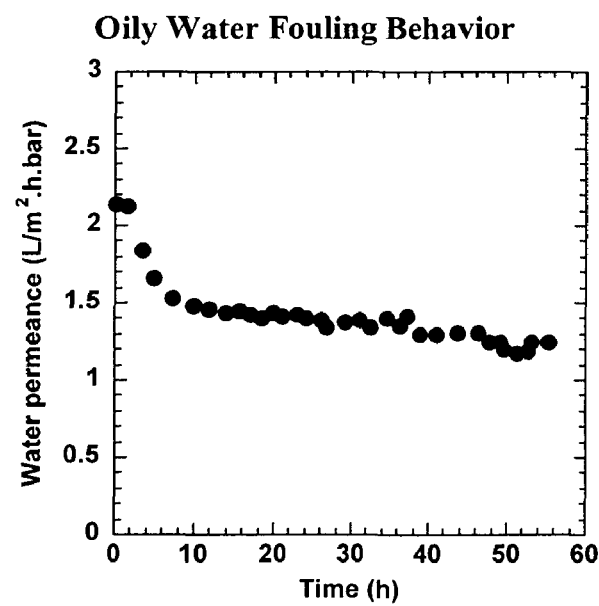

FIG. 25A is a graph of the fouling of a commercial AG reverse osmosis membrane (e.g., GE Osmonics) by oily water (Mixture of oil: Soybean oil from Wesson, surfactant: DC193, a silicone glycol copolymer and oil: surfactant (9:1)+3 L water) using a Dead-end cell. FIG. 25B is a graph of the fouling of a sulfonated hydrophilic-hydrophobic random copolymer having different mole percents 40 (e.g., BPS-40) reverse osmosis membrane by oily water (Mixture of oil: Soybean oil from Wesson, surfactant: DC193, a silicone glycol copolymer and oil: surfactant (9:1)+3 L water).

Figure 26:
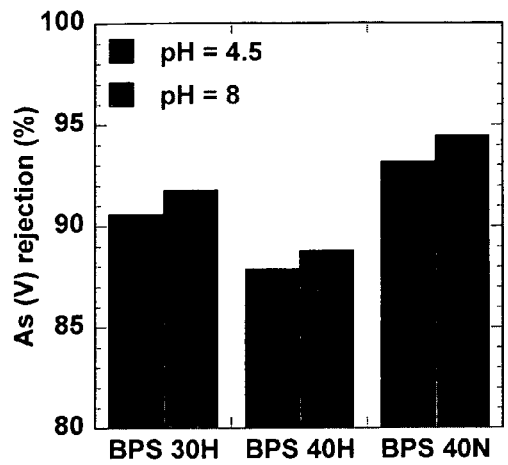
FIGS. 26A and 26B are graphs illustrating arsenic rejection by sulfonated hydrophilic-hydrophobic random copolymer membranes of FIG. 26C.
Figure 26:
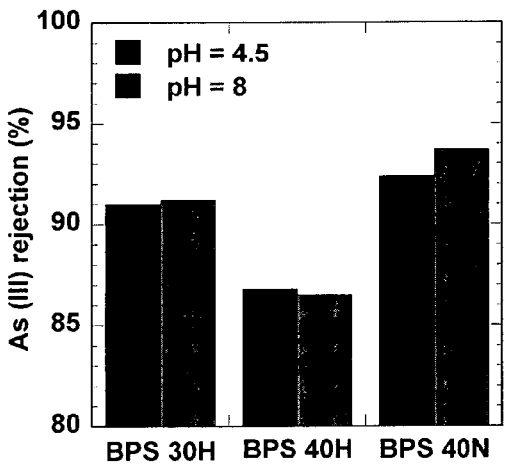
Figure 26:
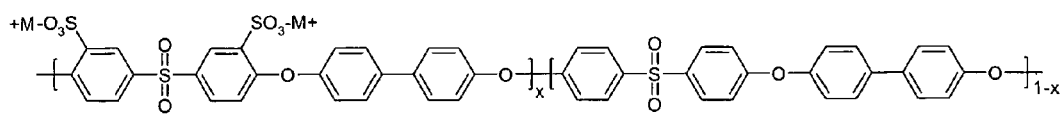

In addition, the sulfonated hydrophilic-hydrophobic random copolymer of the present invention may be used to remove arsenic (As) in drinking water. FIGS. 26A and 26B are graphs illustrating arsenic V (As V) and arsenic III (As III) rejection, respectively, by a sulfonated hydrophilic-hydrophobic random copolymer membranes having the structure as seen in FIG. 26C.

Figure 27:
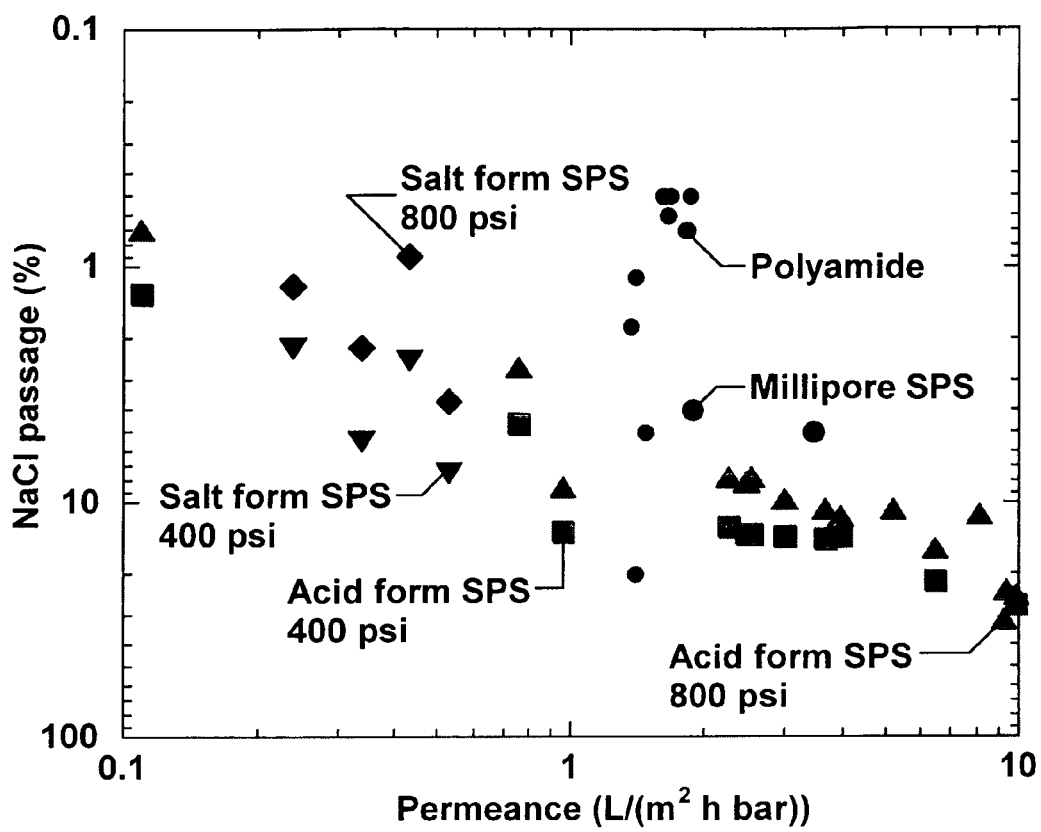
FIG. 27 is a graph of the trade-off relationship between permeate flux and NaCl passage for sulfonated polysulfone membranes.

FIG. 27 is a graph of the trade-off relationship between permeate flux and NaCl passage for sulfonated polysulfone (SPS) based upon membrane thickness of 1 μm for both the acid form and the salt form of the sulfonated polysulfone.

The present invention provides a hydrophilic-hydrophobic multi-block copolymer having one or more hydrophilic repeating monomers attached to one or more hydrophobic repeating monomers, as well as methods of making the copolymer and the cross-linked polymer. The one or more hydrophilic repeating monomers include repeats of a sulfonated polyarylsulfone attached to a second aromatic molecule. The one or more hydrophobic repeating monomers include repeats of a third aromatic molecule attached to a fourth aromatic molecule. The mole percentage of the hydrophilic-hydrophobic multi-block copolymers may be between 5 and 80 percent. The hydrophilic-hydrophobic multi-block copolymer may be crossed linked to form a cross-linked hydrophilic-hydrophobic multi-block polymer and made into a membrane.

A specific example of the hydrophilic-hydrophobic multi-block copolymer include the sulfonated polyarylsulfone being a disulfonated-diphenylsulfone, the second aromatic molecule being a biphenol, the third aromatic molecule being a diphenylsulfone and the fourth aromatic molecule being a biphenol.

Another specific example of the hydrophilic-hydrophobic multi-block copolymer include the sulfonated polyarylsulfone being a disulfonated-diphenylsulfone, the second aromatic molecule being a biphenol, the third aromatic molecule being a 2,6-dichloro-benzonitrile, and the fourth aromatic molecule being a biphenol.

Another specific example of the hydrophilic-hydrophobic multi-block copolymer include the sulfonated polyarylsulfone being a disulfonated-diphenylsulfone, the second aromatic molecule being a biphenol, the third aromatic molecule being a 4,4'-difluoro-triphenyl phosphine oxide, and the fourth aromatic molecule being a biphenol.

Another embodiment of the present invention includes a hydrophilic-hydrophobic multi-block copolymer and a method of making it with one or more hydrophilic monomers and one or more hydrophobic monomers. The one or more hydrophilic monomers include a hydrophilic repeating subunit having a sulfonated polyarylsulfone attached to two second aromatic molecules. The one or more hydrophobic monomers include a hydrophobic repeating subunit having a third aromatic molecule attached to two fourth aromatic molecules.

Generally, the sulfonated polyarylsulfone may be a disulfonated-diphenylsulfone, a monosulfonated-diphenylsulfone, a substituted-diphenylsulfone, or a disubstituted-diphenylsulfone. However the skilled artisan will recognize that other substitutions may be made to alter the specific properties.

Generally, the second aromatic molecule includes a biphenol, a substituted biphenol, a multiply substituted biphenyl, 2,2-bis-phenylpropane, a substituted 2,2-bis-phenylpropane, a multiply substituted 2,2-bis-phenylpropane, 1,1-di(trifluoromethane)(diphenylmethane), a substituted 1,1-di(trifluoromethane)(diphenylmethane), or a multiply substituted 1,1-di(trifluoromethane)(diphenylmethane).

Generally, the third aromatic molecule may be a diphenylsulfone, a substituted diphenylsulfone, a multiply substituted diphenylsulfone, a 2,6-dichloro-benzonitrile, a substituted 2,6-dichloro-benzonitrile, a multiply substituted 2,6-dichloro-benzonitrile, 4,4'-difluoro-triphenyl phosphine oxide a substituted 4,4'-difluoro-triphenyl phosphine oxide, or a multiply substituted 4,4'-difluoro-triphenyl phosphine oxide.

Generally, the fourth aromatic molecule may be a biphenol, a substituted biphenol, a multiply substituted biphenyl, 2,2-bis-phenylpropane, a substituted 2,2-bis-phenylpropane, a multiply substituted 2,2-bis-phenylpropane, 1,1-di(trifluoromethane)(diphenylmethane), a substituted 1,1-di(trifluoromethane)(diphenylmethane), or a multiply substituted 1,1-di(trifluoromethane)(diphenylmethane).

A solvent purification membrane is also provided by the present invention and may be used to purify, clean, separate or filter solvents. One common application is a reverse osmosis water purification membrane. Additionally, given the structure of the membrane it may also be used in fuel cells. The membrane includes two or more cross-linked hydrophilic-hydrophobic multi-block copolymers. Each of the two or more cross-linked hydrophilic-hydrophobic multi-block copolymers has one or more hydrophilic repeating subunits with a sulfonated polyarylsulfone attached to a second aromatic molecule attached to one or more hydrophobic repeating subunits of a third aromatic molecule attached to a fourth aromatic molecule.

The sulfonated polyarylsulfone of a preferred embodiment includes such aryl sulfonates as polyethersulfone and polysulfone. Other suitable aryl sulfonate polymers that may be used include polyarylene etherethersulfone, polyarylene ethersulfone, polyarylenepropylenearylene etherether sulfone, polyaryl sulfones, polyaryl ether sulfones, polyaryl ether ketones, poly ether ether ketones, polystyrene, and copolymers thereof.

In addition, additives typically used in membrane production may be added to the copolymers, the polymers or the monomers. Liquid additives and non-solvents may also be added, e.g., up to about 25 weight percent. Generally, additives include alcohols, polar solvents, acid organic solvents and alkali metal halides (e.g., NaCl and LiCl).

Generally, the polymer materials of the present invention may be cast by preparing a casting solution and forming a thin sheet of material. The physical characteristics (e.g., morphology, porosity, etc) of the polymer material can be altered by changing the polymer composition, the casting solution or the processing conditions.

The sulfonated polyarylsulfone polymers may be cast into porous matrices, non-porous matrices or membrane matrices using any conventional procedure wherein the casting solution is spread in a layer onto a nonporous support from which the matrix later can be separated after coagulating. The matrices can be cast manually by being poured, cast, or spread onto a casting surface followed by application of a coagulation liquid onto the casting surface. Alternatively, the matrices may be cast automatically by pouring the solution onto a moving bed.

As the cross-linking reaction result in limiting the distances among the main chains and increasing the rigidity of the polymers, relatively larger molecules such as methanol cannot permeate through the polymers. For example, one catalyst for the cross-linking reaction, 1-[3-(dimethylamino)propyl]-3-ethylcarbodiimide hydrochloride (EDC) can be used to form ester bonding, while NaH or PPh3 can be used if the cross-linking is formed by ether bonding.

For example, other polymers useful in the present invention include, sulfone homopolymers and copolymers such as polymers of polysulfone, polyethersulfone, polyphenylsulfone, and sulfonated polysulfone; homopolymers and copolymers of polyacrylonitrile, polyetherimide, and poly (vinylidene fluoride); and mixtures thereof.

The polymerization to form copolymers can be carried out using condensation polymerization methods known to those skilled in the art. The reaction between one or more monomers and a diol can be broadly characterized as a nucelophilic substitution polymerization reaction. Nucleophilic substitution reactions, as is known to those skilled in the art, involve the reaction of a compound containing a leaving group with a compound containing a nucleophilic group. For example, a first aromatic subunit with two nucleophilic groups (e.g., OH and SH) can be copolymerized with a second subunit having two leaving groups (e.g., F, Cl and NO2). The amount of monomer can be selected by one skilled in the art, depending in part upon the properties desired in the copolymer and polymer. Specifically, a biphenyl subunit with two nucleophilic groups (e.g., OH) can be polymerized with a second subunit 3,3'-Disulfonated-4,4'-dichlorodiphenylsulfone and a 4,4'-Dichlorodiphenylsulfone each having two leaving groups (e.g. Cl).

Solvents useful for the polymerization include dimethyl formamide, dimethyl acetamide, diphenyl sulfone, dimethyl sulfoxide, and NMP. The polymer can be recovered by conventional methods such as, for example, coagulation.

The disulfonated-diphenylsulfone, the monosulfonated-diphenylsulfone, the substituted-diphenylsulfone, the disubstituted-diphenylsulfone, the biphenol, the substituted biphenol, the multiply substituted biphenyl, 2,2-bis-phenylpropane, the substituted 2,2-bis-phenylpropane, the multiply substituted 2,2-bis-phenylpropane, the 1,1-di(trifluoromethane)(diphenylmethane), the substituted 1,1-di(trifluoromethane)(diphenylmethane), the multiply substituted 1,1-di(trifluoromethane)(diphenylmethane), the diphenylsulfone, the substituted diphenylsulfone, the multiply substituted diphenylsulfone, the 2,6-dichloro-benzonitrile, the substituted 2,6-dichloro-benzonitrile, the multiply substituted 2,6-dichloro-benzonitrile, 4,4'-difluoro-triphenyl phosphine oxide, the substituted 4,4'-difluoro-triphenyl phosphine oxide, or the multiply substituted 4,4'-difluoro-triphenyl phosphine oxide include one or more substitutions selected from the following groups: lower alkyl, alkenyl, amino, aryl, alkylaryl, halogen, halo, haloalkyl, phosphoryl or combination thereof.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES (1) Whittingham, M. S.; Savinell, R. F.; Zawodzinski, T. Chem. Rev. 2004, 104, 4243.

(2) Winter, M.; Brodd, R. J. Chem. Rev. 2004, 104, 4245.

(3) Hickner, M. A.; Ghassemi, H.; Kim, Y. S.; Einsla, B. R.; McGrath, J. E. Chem. Rev. 2004, 104, 4587.

(4) Kerres, J. A. J. Membr. Sci. 2001, 185, 3.

(5) Mauritz, K. A.; Moore, R. B. Chem. Rev. 2004, 104, 4535.

(6) Harrison, W. L.; Wang, F.; Mecham, J. B.; Bhanu, V. A.; Hill, M.; Kim, Y. S.; McGrath, J. E. J. Polym. Sci. Part A: Polym. Chem. 2003, 41, 2264.

(7) Wang, F.; Hickner, M.; Ji, Q.; Harrison, W.; Mecham, J.; Zawodzinski, T. A.; McGrath, J. E. Macromol. Symp. 2001, 175, 387.

(8) Wang, F.; Hickner, M.; Kim, Y. S.; Zawodzinski, T. A.; McGrath, J. E. J. Membr. Sci. 2002, 197, 231.

(9) Roy, A.; Hickner, M. A.; Yu, X.; Li, Y.; Glass, T.; McGrath, J. E. J. Polym. Sci. Part B: Polym. Phys. 2006, 44, 2226.

(10) Yu, X.; Roy, A.; McGrath, J. E. Div. Fuel Chem. 2005, 50(2), 577.

(11) Yu, X.; Roy, A.; McGrath, J. E. PMSE Preprints 2006, 95, 141.

(12) Sankir, M.; Bhanu, V. A.; Harrison, W. L.; Ghassemi, H.; Wiles, K. B.; Glass, T. E.; Brink, A. E.; Brink, M. H.; McGrath, J. E. J. Appl. Polym. Sci. 2006, 100, 4595.

(13) Zawodzinski, T. A.; Neeman, M.; Sillerud, L. O.; Gottesfeld, S. J. Phys. Chem. 1991, 95, 6040.

(14) Springer, T. E.; Zawodzinski, T. A.; Wilson, M. S.; Gottesfeld, S. J. Electrochem. Soc. 1996, 143, 587.

(15) Ghi, P. Y.; Hill, D. J. T.; Whittaker, A. K. Biomacromolecules 2002, 3, 554.

(16) Zawodzinski, T. A.; Springer, T. E.; Neeman, M.; Sillerud, L. O. Isr. J. Chem. 1992, 32, 281.

(17) Kim, Y. S.; Wang, F.; Hickner, M.; McCartney, S.; Hong, Y. T.; Harrison, W.; Zawodzinski, T. A.; McGrath, J. E. J. Polym. Sci. Part B: Polym. Phys. 2003, 41, 2816.

(18) Roy, A.; Yu, X.; Badami, A.; McGrath, J. E. Abstracts of Papers, 231st ACS National Meeting, Atlanta, Ga., United States, Mar. 26-30, 2006, PMSE-111.

(19) Kreuer, K. D., On the complexity of proton conduction phenomena. Solid State Ionics 2000, 136, 149-160. Solid State Ionics 2000, 136, 149.

What is claimed is:

1. A method of making a hydrophilic-hydrophobic random copolymer water purification membrane comprising the steps of:
    forming a hydrophilic-hydrophobic random copolymer comprising one or more hydrophilic monomers comprising a sulfonated polyarylsulfone monomer and a second monomer and one or more hydrophobic monomers comprising a non-sulfonated third monomer and a fourth monomer, wherein the sulfonated polyarylsulfone monomer introduces a sulfonate into the hydrophilic-hydrophobic random copolymer; and
    forming the hydrophilic-hydrophobic random copolymer into a hydrophilic-hydrophobic random copolymer water purification membrane for use in a water purification system,
    wherein the sulfonated polyarylsulfone monomer comprises a disulfonated-diphenylsulfone, the second monomer comprises a biphenol, the non-sulfonated third monomer comprises a 4, 4'-difluoro-triphenyl phosphine oxide, and the fourth monomer comprises a biphenol.

2. The method of claim 1, wherein the sulfonated polyarylsulfone monomer, the second monomer, the non-sulfonated third monomer and the fourth monomer are connected individually by an ether bond.

3. The method of claim 1, wherein the sulfonated polyarylsulfone monomer, the second monomer, the non-sulfonated third monomer and the fourth monomer are independently connected by an O, a S, a C, a F, a $C(CH_3)_2$ group, a $CF_3$ group, a $C(CF_3)$ group, a $C(CF_3)_2$ group, a $C(CF_3)(C_6H_5)$ group, a $C(O)$ group, a coo group, a $S(O)_2$ group, and a $P(O)(C_6H_5)$ group, or a carbon-carbon single bond.

4. The method of claim 1, further comprising the step of adding one or more cross-linking agents to the hydrophilic-hydrophobic random copolymer to form a cross-linked hydrophilic-hydrophobic random copolymer.

5. The method of claim 1, wherein the hydrophilic-hydrophobic random copolymer has a mole percentage between 5 and 80 percent.

6. A hydrophilic-hydrophobic random copolymer water purification membrane comprising:
    one or more polymerized hydrophilic regions comprising a sulfonated polyarylsulfone monomer and a second monomer; and
    one or more polymerized hydrophobic regions comprising a non-sulfonated third monomer and a fourth monomer, wherein the sulfonated polyarylsulfone monomer introduces a sulfonate into the hydrophilic-hydrophobic random copolymer to form a hydrophilic-hydrophobic random copolymer water purification membrane for use in a water purification system,
    wherein the sulfonated polyarylsulfone monomer comprises a disulfonated-diphenylsulfone, the second monomer comprises a biphenol, the non-sulfonated third monomer comprises a 2,6-dichloro-benzonitrile or a 4,4'-difluoro-triphenyl phosphine oxide, and the fourth monomer comprises a biphenol.

7. The random copolymer water purification membrane composition of claim 6, wherein the sulfonated polyarylsulfone monomer, the second monomer, the non-sulfonated third monomer and the fourth monomer are connected independently by an O, a S, a C, a F, a $C(CH_3)_2$ group, a $CF_3$ group, a $CH(CF_3)$ group, a $C(CF_3)_2$ group, a $C(CF_3)(C_6H_5)$ group, a $C(O)$ group, a coo group, a $S(O)_2$ group, and a $P(O)(C_6H_5)$ group, or a carbon-carbon single bond.

8. The random copolymer water purification membrane composition of claim 6, wherein the sulfonated polyarylsulfone monomer, the second monomer, the non-sulfonated third monomer and the fourth monomer are individually connected by an ether bond.

9. The random copolymer water purification membrane composition of claim 6, wherein the hydrophilic-hydrophobic random copolymer membrane has a mole percentage between 5 and 80 percent.

10. A method of making a chlorine tolerant hydrophilic-hydrophobic copolymer desalination water purification membrane comprising the steps of:
    forming a polymerized hydrophilic-hydrophobic random copolymer comprising one or more hydrophilic monomers comprising a sulfonated polyarylsulfone monomer and a second monomer and one or more hydrophobic monomers comprising a non-sulfonated third monomer and a fourth monomer, wherein the sulfonated polyarylsulfone monomer introduces the sulfonate into the hydrophilic-hydrophobic random copolymer; and
    forming the polymerized hydrophilic-hydrophobic random copolymer into a polymerized hydrophilic-hydrophobic copolymer desalination water purification membrane that is chlorine tolerant membrane,
    wherein the sulfonated polyarylsulfone monomer comprises a disulfonated-diphenylsulfone, the second monomer comprises a biphenol, the non-sulfonated third monomer comprises a 2,6-dichloro-benzonitrile or a 4,4'-difluoro-triphenyl phosphine oxide, and the fourth monomer comprises a biphenol.

11. A hydrophilic-hydrophobic random copolymer desalination water purification membrane comprising a polymer having one or more units having the structure:

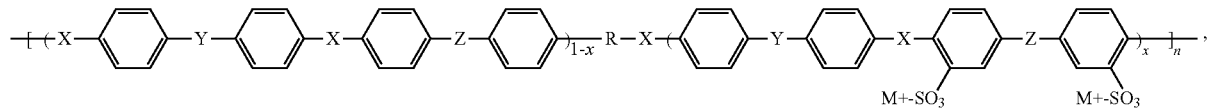

wherein X is an O, Y is a C(CF₃) group or a P(O)(C₆H₅) group, Z is a S(O)₂ group, and R is a carbon-carbon single bond.

12. A chlorine tolerant hydrophilic-hydrophobic copolymer desalination water purification membrane containing units of the following formula:

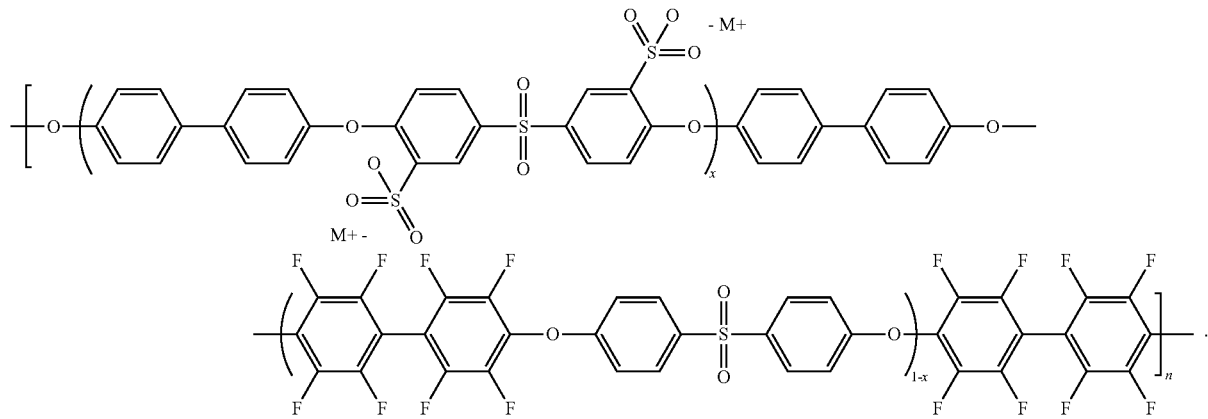

wherein X, Y, Z and R independently comprise an O, a S, a C, a F, C(CH₃)₂ group, a CF₃ group, a C(CF₃) group, a C(CF₃)₂ group, a C(CF₃)(C₆H₅) group, a C(O) group, a COO group, a S(O)₂ group, or a P(O)(C₆H₅) group, or a carbon-carbon single bond.

13. A method of making a hydrophilic-hydrophobic random copolymer water purification membrane comprising the steps of :
forming a hydrophilic-hydrophobic random copolymer comprising one or more hydrophilic monomers comprising a sulfonated polyarylsulfone monomer and a second monomer and one or more hydrophobic monomers comprising a non-sulfonated third monomer and a fourth monomer, wherein the sulfonated polyarylsulfone monomer introduces a sulfonate into the hydrophilic-hydrophobic random copolymer;
forming the hydrophilic-hydrophobic random copolymer into a hydrophilic-hydrophobic random copolymer water purification membrane for use in a water purification system; and
adding one or more cross-linking agents to the hydrophilic-hydrophobic random copolymer to form a cross-linked hydrophilic-hydrophobic random copolymer.

14. The method of claim 13, wherein the sulfonated polyarylsulfone monomer comprises a disulfonated-diphenylsulfone monomer, the second monomer comprises a biphenol, the non-sulfonated third monomer comprises a diphenylsulfone, and the fourth monomer comprises a biphenol.

15. The method of claim 13, wherein the sulfonated polyarylsulfone monomer comprises a disulfonated-diphenylsulfone, the second monomer comprises a biphenol, the non-sulfonated third monomer comprises a 2,6-dichloro-benzonitrile, and the fourth monomer comprises a biphenol.

16. The method of claim 13, wherein the sulfonated polyarylsulfone monomer comprises a disulfonated-diphenylsulfone, the second monomer comprises a biphenol, the non-sulfonated third monomer comprises a 4,4'-difluoro-triphenyl phosphine oxide, and the fourth monomer comprises a biphenol.

17. The method of claim 13, wherein the sulfonated polyarylsulfone monomer comprises a disulfonated-diphenylsulfone, a monosulfonated-diphenylsulfone, a substituted-diphenylsulfone, or a disubstituted-diphenylsulfone.

18. The method of claim 13, wherein the second monomer comprises a biphenol, a substituted biphenol, a multiply substituted biphenyl, 2,2-bis-phenylpropane, a substituted 2,2-bis-phenylpropane, a multiply substituted 2,2-bis-phenylpropane, 1,1-di(trifluoromethane)(diphenylmethane), a substituted 1,1-di(trifluoromethane)(diphenylmethane), or a multiply substituted 1,1-di(trifluoromethane)(diphenylmethane).

19. The method of claim 13, wherein the non-sulfonated third monomer comprises a diphenylsulfone, a substituted diphenylsulfone, a multiply substituted diphenylsulfone, a 2,6-dichloro-benzonitrile, a substituted 2,6-dichloro-benzonitrile, a multiply substituted 2,6-dichloro-benzonitrile, 4,4'-difluoro-triphenyl phosphine oxide a substituted 4,4'-difluoro-triphenyl phosphine oxide, or a multiply substituted 4,4'-difluoro-triphenyl phosphine oxide.

20. The method of claim 13, wherein the fourth monomer comprises a biphenol, a substituted biphenol, a multiply substituted biphenyl, a 2,2-bis-phenylpropane, a substituted 2,2-bis-phenylpropane, a multiply substituted 2,2-bis-phenylpropane, a 1,1-di(trifluoromethane)(diphenylmethane), a substituted 1,1-di(trifluoromethane)(diphenylmethane), or a multiply substituted 1,1-di(trifluoromethane)(diphenylmethane).

21. The method of claim 13, wherein the sulfonated polyarylsulfone monomer, the second monomer, the non-sulfonated third monomer and the fourth monomer are connected individually by an ether bond.

22. The method of claim 13, wherein the sulfonated polyarylsulfone monomer, the second monomer, the non-sulfonated third monomer and the fourth monomer are independently connected by an O, a S, a C, a F, a C(CH$_3$)$_2$ group, a CF$_3$ group, a C(CF$_3$) group, a C(CF$_3$)$_2$ group, a C(CF$_3$)(C$_6$H$_5$) group, a C(O) group, a COO group, a S(O)$_2$ group, and a P(O)(C$_6$H$_5$) group, or a carbon-carbon single bond.

23. The method of claim 13, wherein the hydrophilic-hydrophobic random copolymer has a mole percentage between 5 and 80 percent.

24. The method of claim 13, further comprising the step of forming the hydrophilic-hydrophobic random copolymer into a hydrophilic-hydrophobic random copolymer membrane.

\* \* \* \* \*